(12) United States Patent
Patil et al.

(10) Patent No.: US 11,042,639 B2
(45) Date of Patent: *Jun. 22, 2021

(54) EXCLUDING STRESSED MACHINES FROM LOAD BALANCING OF DISTRIBUTED APPLICATIONS

(71) Applicant: Nicira, Inc., Palo Alto, CA (US)

(72) Inventors: Amit Vasant Patil, Pune (IN); Vasantha Kumar, Tamil Nadu (IN)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/684,260

(22) Filed: Nov. 14, 2019

(65) Prior Publication Data

US 2020/0082085 A1 Mar. 12, 2020

Related U.S. Application Data

(63) Continuation of application No. 15/282,867, filed on Sep. 30, 2016, now Pat. No. 10,482,249.

(30) Foreign Application Priority Data

Aug. 9, 2016 (IN) .............................. 201641027262

(51) Int. Cl.
*G06F 21/56* (2013.01)
*G06F 21/51* (2013.01)
*G06F 21/50* (2013.01)
*G06F 21/55* (2013.01)
*H04L 29/06* (2006.01)

(Continued)

(52) U.S. Cl.
CPC ............ *G06F 21/568* (2013.01); *G06F 21/50* (2013.01); *G06F 21/51* (2013.01); *G06F 21/554* (2013.01); *G06F 21/56* (2013.01); *G06F 21/564* (2013.01); *H04L 43/0817* (2013.01); *H04L 43/16* (2013.01); *H04L 63/1408* (2013.01); *H04L 67/02* (2013.01); *H04L 67/1008* (2013.01)

(58) Field of Classification Search
CPC .... G06F 21/568; G06F 21/554; G06F 21/564; H04L 63/1408; H04L 67/1008; H04L 67/02; H04L 43/16

See application file for complete search history.

(56) References Cited

U.S. PATENT DOCUMENTS

| 8,443,363 | B1 | 5/2013 | Brennan et al. |
| 10,423,790 | B2 | 9/2019 | Patil et al. |
| 10,482,249 | B2 | 11/2019 | Patil et al. |

(Continued)

*Primary Examiner* — Michael A Keller
(74) *Attorney, Agent, or Firm* — Adeli LLP

(57) ABSTRACT

Some embodiments provide a method for an end machine, that implements a distributed application, to redirect new network connection requests to other end machines that also implement the distributed application. The method receives a set of measurement data from a set of resources of the end machine and determines whether a measurement data received from a particular resource has exceeded a threshold. When the measurement data has exceeded the threshold, the method notifies a load balancer that balances new requests for connection to the distributed application between the end machines. The notification causes the load balancer not to send any new connection request to the end machine and redirect them to other end machines.

18 Claims, 10 Drawing Sheets

(51) Int. Cl.
*H04L 12/26* (2006.01)
*H04L 29/08* (2006.01)

(56) References Cited

U.S. PATENT DOCUMENTS

| | | |
|---|---|---|
| 2006/0250249 A1 | 11/2006 | Cheng |
| 2015/0019444 A1 | 1/2015 | Purves |
| 2015/0058619 A1* | 2/2015 | Sweet .................. H04L 9/3247 713/155 |
| 2015/0067688 A1* | 3/2015 | Nagasawa ............. G06F 9/4881 718/102 |
| 2015/0089034 A1 | 3/2015 | Stickle et al. |
| 2015/0121483 A1 | 4/2015 | Perez et al. |
| 2015/0180909 A1* | 6/2015 | Nakamatsu ......... H04L 65/1046 370/230 |
| 2015/0324220 A1 | 11/2015 | Bugenhagen |
| 2017/0054759 A1* | 2/2017 | Lee ....................... G06F 21/577 |
| 2017/0171159 A1* | 6/2017 | Kumar ................ H04L 63/0281 |
| 2018/0046807 A1 | 2/2018 | Patil et al. |
| 2018/0048702 A1 | 2/2018 | Patil et al. |

* cited by examiner

EXCLUDING STRESSED MACHINES FROM LOAD BALANCING OF DISTRIBUTED APPLICATIONS

CLAIM OF BENEFIT TO PRIOR APPLICATIONS

This application is a continuation application of U.S. patent application Ser. No. 15/282,867, filed Sep. 30, 2016, now published as U.S. Patent Publication 2018/0048702. U.S. patent application Ser. No. 15/282,867, claims the benefit of Indian Patent Application 201641027262, filed Aug. 9, 2016. U.S. patent application Ser. No. 15/282,867, now published as U.S. Patent Publication 2018/0048702, is incorporated herein by reference.

BACKGROUND

Software-Defined Networking (SDN) is an evolving networking paradigm that still faces shortcomings that have to be overcome. A logical overlay network that is implemented over a physical network infrastructure of a hosting system for a tenant of the hosting system is a good example of SDN. A logical network, logically connects different virtual machines (VMs) of a tenant, which run on one or more host machines, to each other and to other end machines (i.e., physical and/or virtual machines) of other external networks (i.e., physical and/or logical networks). A logical network may logically connect different virtual servers, on which, a distributed application (e.g., a multi-layer web application) executes.

Conventionally, in order to balance the distributed application's load on the virtual servers that implement the different layers of the application, one or more load balancers distribute incoming service requests to the application (e.g., new network connection requests) between the different virtual servers. The conventional load balancers, however, distribute the new requests solely based on the network traffic routed to each virtual server since the load balancers lack visibility into the state of the VMs that host the distributed application. That is, in balancing the load of a distributed application, the load balancers disregard the current state of the VMs (i.e., virtual servers) and the load on each VM and across the VMs of a host machine. For example, a load balancer may send a new network connection request to a VM only because the network traffic forwarded to the VM is light, while CPU usage of the VM is very high, or available virtual memory of the VM is very low.

BRIEF SUMMARY

Some embodiments provide a method for collecting different measurement and statistical data from different computing resources of a data compute node (DCN) in order to identify a stress level of the DCN. In some embodiments, a software instance or module (e.g., an agent, a driver, etc.) that is instantiated at a DCN (e.g., in the user or kernel space of DCN) collects the measurement and statistical data from the computing resources (e.g., one or more CPUs, memory, etc.) of the DCN in real time. The measurement and statistical data, in some embodiments, include central processing unit (CPU) usage, available and used volatile and/or non-volatile memory, network activity, etc., which are collected by the software module (also referred to as measurement data collection (MDC) module hereinafter) of the end machine in real time.

When the load on a resource of a DCN exceeds a predefined amount, the DCN of some embodiments notifies a central monitoring agent in the host machine, on which the DCN executes, of such an overload. That is, when the usage of any of the resources of a DCN, from which the measurement data is collected, surpasses a predefined threshold, the method sends a notification to the central monitoring agent (also referred to as measurement data monitor) informing the monitoring agent about the overloaded resource as well as the load amount on the resource. For example, the MDC module running on a DCN sends a total amount of CPU usage of the DCN to the measurement data monitor when the CPU usage exceeds a certain percentage that has been defined for the MDC module (e.g., through configuration data with which the MDC module has been configured).

As stated above, the MDC module collects the measurement data from different computing resources of a DCN in real time. In some embodiments, the MDC module collects the measurement data from the different resources periodically and at certain time intervals that can be overridden or modified. In some embodiments a user (e.g., a network administrator) can manually initiate data collection for one or more computing resources. In some embodiment, the MDC module may receive updated measurement data from a previously overloaded resource of a stressed machine informing the MDC module that the resource is not overloaded anymore. After receiving the updated data, the MDC module of some embodiments notifies the measurement data monitor of the change in status of the DCN (i.e., MDC module informs the measurement data monitor that the DCN should not be considered as a stressed DCN anymore).

In some embodiments, when the MDC module receives measurement data that exceeds a first threshold amount from a DCN and tags the DCN as a stressed DCN, the MDC module uses a second threshold amount, that is different from the first threshold amount, to untag the DCN as a stressed DCN. The second threshold amount, in some embodiments, is calculated based on the value of the first threshold amount, which is received from a user (in a tolerance policy defined by the user). The calculated threshold amount for untagging a DCN as a stressed DCN, in some embodiments, is less than the threshold amount for tagging the DCN as a stressed DCN.

For example, an MDC module of a particular VM might have previously reported the VM as a stressed VM to a measurement data monitor of a host machine that hosts the VM. The VM might have done so when the MDC module of the VM determines that the usage of random access memory (RAM) of the VM has exceeded 80% (a threshold defined by a user). However, the MDC module will not untag the VM when the RAM usage of the VM returns to under 80%. This is because, the threshold amount for RAM usage to untag the VM is calculated at 65%. Therefore, if during a later data collection, the MDC module realizes that the free space in the VM's RAM is now over 35%, the MDC module sends a notification to the measurement data monitor to inform the monitor that the VM is not stressed anymore.

In some embodiments, a controller calculates the threshold amount to remove the DCN from a stressed security group, while in other embodiments the measurement data monitor of a host machine, or the DCN module itself yields this threshold amount. Yet, in some other embodiments, a user defines both stressed and unstressed threshold amounts for the computing resources in the tolerance policy. The reason for having different threshold amounts for tagging and untagging a DCN as a stressed DCN is to prevent rapid switching between the stressed and unstressed states for a particular DCN. In some embodiments, both threshold amounts, however, are the same and the intervals between collections of measurement data from a DCN is long enough to prevent such rapid changes of status.

In some embodiments, when the measurement data monitor receives a notification from a stressed DCN, the monitor tags the DCN to be added to a particular security group, the members of which are all tagged as stressed machines. Similarly, when the measurement data monitor receives a notification from a DCN that was previously tagged as stressed and now is not stressed anymore, the monitor removes the tag from the DCN in order to remove the DCN from the particular security group. A security group, in some embodiments, may include any type of network entity (e.g., one or more virtual network controllers (VNICs), virtual machines (VMs), host machines, or any other compute and/or network construct that participates in a logical and/or physical network). In some embodiments, a stressed security group can be specified as a dynamic container that can have members (e.g., stressed VMs) dynamically added to and/or removed from the container.

The measurement data monitor of some embodiments executes on each host machine (e.g., in a virtualization software such as the hypervisor of a host machine) that hosts the end machines of the logical network as well as other end machines of other logical networks. The measurement data monitor receives the load amounts from different stressed machines that operate on the host machine and aggregates the received amounts in order to determine the host machine's level of stress in real time. In some embodiments, the measurement data monitor of a host machine reports the host machine as a stressed machine when the aggregated amount is higher than a predefined threshold.

In some embodiments, a user (e.g., a network administrator, a tenant of a datacenter, etc.) defines a tolerance policy that provides a threshold level for each computing resource of a particular set of DCNs (e.g., DCNs that belong to a particular logical network, DCNs that run on a particular set of host machines, all of the DCNs of a datacenter, etc.). The user may also define a host-level tolerance or threshold for different resources of a particular set of host machines (e.g., the host machines that implement one or more logical networks). In some embodiments, the user defines a tolerance policy for the logical networks through a set of application programming interface (API) calls to a management and control system (e.g., a manager machine or application in the management and control system) of the network.

The management and control system, based on the user's policy definition, (1) configures the hypervisors of host machines to implement the measurement data monitors and (2) configures the DCNs that run on the host machines to implement the measurement data collection modules. The management and control system of some embodiments configures a unique measurement data monitor on each host machine and a unique MDC module on each DCN. In some embodiments, the measurement data monitor of a host machine receives the configuration data from the management and control system and configures each DCN that runs on the host machine to implement an MDC module. The tolerance policy that a user defines for one or more logical networks can be used for different purposes in different embodiments.

As part of providing security for the DCNs that run on a host machine, some embodiments scan the DCNs automatically (e.g., at certain time intervals), or upon occurrence of a certain event (e.g., upon a user request, when a DCN boots up on the host machine, etc.) to identify potential security breaches. The security scans, in some embodiments, include, but are not limited to antivirus scans, antimalware scans, vulnerability management scans, data security scans (to identify data that violates a security policy defined for one or more logical networks), etc. In some embodiments a security application (e.g., a third-party antivirus/antimalware software) schedules the security scans for the DCNs of a host machine through a security appliance (e.g., a third party service VM) that runs on the same host machine as the DCNs.

The security application of some embodiments runs on a security appliance inside the host machine, or on another machine separate from the host machine. The security appliance receives the results of each security scan and either decides how to handle the security breaches itself, or alternatively forwards the results to a separate machine to handle the security breaches. These security scans, however, are scheduled to be performed on the DCNs regardless of the current state of the DCNs. Therefore, when a DCN is overstressed (i.e., one or more resources of the DCN are overloaded), scanning the DCN would add more load to the already overloaded resources of the DCN and can result in failure of the resources and thereby failure of the DCN.

In order to improve and optimize the efficiency of a scheduled security scan, some embodiments do not allow a security scan to be performed on a stressed DCN of a host machine even though the schedule for the scan dictates otherwise. As stated above, the MDC module of some embodiments reports a stressed DCN to the measurement data monitor that resides in the hypervisor of a host machine. The measurement data monitor of some embodiments, upon receipt of the notification, adds the reported stressed VM to a dynamic container (i.e., a stressed security group) which includes all of the stressed VMs.

Upon receiving a stress notification from an MDC module, the measurement data monitor of some embodiments also sends a notification to a security agent that resides in the hypervisor and that communicates with the security appliance running on the host machine. This notification informs the security appliance that the VM is overstressed and should not participate in any future scheduled scans. Some embodiments also define a security policy in which any VM that is tagged as a member of the stressed security group would defer any scheduled scanning data packet received from the security appliance. This way, even if the security appliance ignores the notification sent by the measurement data monitor, the security policy defined for the stressed security group causes the members of this group to defer scheduled scan requests till stress levels of the members are within limits defined by the policy.

Another advantage of having the stressed machines tagged in a particular (stressed) security group is to exclude DCNs of the security group while load balancing a distributed application (e.g., a multi-tier web application). In some embodiments, a load balancer (e.g., a logical or physical forwarding element) balances new remote service requests among several different servers (e.g., virtual servers) of a server cluster that implements a distributed application. Some embodiments deploy the stressed security group in order to redirect new network connection requests sent to a stressed server (from remote clients), to other healthy servers.

That is, the load balancer of some embodiments subscribes to the stressed security group to identify the stressed servers among the servers that implement the distributed application and foregoes sending new network connection requests to the stressed servers. The load balancer of some such embodiments does so even if the stressed server has enough network bandwidth for receiving new connections. In some embodiments, after subscribing to the security group, the load balancer receives callback notifications (e.g., from a controller that manages the security group) each time a new stressed server in the server cluster that implements the distributed application is added to the security group or each time a server is removed from the security group. Based on the callback notifications, the load balancer becomes aware of the updated status of the stressed servers and does not direct any new connections to these servers.

In other words, in addition to balancing the load of a distributed application between the servers based on the network traffic that is currently routed to each server and the network bandwidth and availability of the servers, a load balancer also takes into account how busy each of these servers are before sending new network connection requests to the servers. In some embodiments, when a server is stressed (i.e., one or more of the server's resources are overloaded), all of the current active connections to the server are maintained and only new requests for connection are redirected to other servers (that are not stressed).

A multi-layer distributed application (e.g., for a tenant of a hosting system), in some embodiments, is implemented by different machines (e.g., virtual and physical machines) that are logically connected to each other in a logical network (e.g., the tenant's logical network). These machines, however, may have spread across several host machines, or connected to the logical network through one or more hardware switches (e.g., a third-party top of rack hardware switch) that implement the logical network. For example, a three-tier web application of a tenant of a datacenter may be implemented by several different web servers, application servers, and database servers that are logically connected to the tenant's logical network. Some of these servers run on one or more host machines that implement the logical network, while the other servers are connected to one or more hardware switches that also implement the logical network.

In some embodiments, a load balancer (or several load balancers) receives the new remote requests to connect to the application (e.g., a request to access the web services) from the remote clients and based on the network traffic load routed to the first-tier servers (e.g., web servers) and the load on these servers sends each new connection request to one of the first-tier servers. Based on the type of request, a first-tier server may need to forward data to one or more second-tier servers (e.g., application servers) for further processing of the request. Some embodiments also provide a load balancer that based on the network traffic and the stress level of the second-tier servers decides to which second-tier server(s) forward the data.

Similarly, when a second-tier server is required to forward data to one or more third-tier servers (e.g., a database server), some embodiments provide a load balancer that based on the network traffic and the stress level of the third-tier servers decides to which third-tier server(s) forward the data. In other words, in some embodiments, each load balancer of the network is subscribed to a stressed security group (or a pool of stressed security groups) in order to determine which servers are tagged as stressed servers before deciding to which next tier server forward a request for connection or other requests for data or additional processing.

In some embodiments, the measurement data monitor, in addition to adding a reported stressed machine to the stressed security group, sends a notification to the load balancer(s) that balances the load of a distributed application between the different servers. This notification informs the load balancer that the machine is overstressed and should not participate in any future load balancing. Some embodiments also define a security policy in which any machine that is tagged as a member of the stressed security group would deny any new connection request packet received from a remote client (or a load balancer).

When the number of stressed machines that should participate in load balancing is more than a threshold, some embodiments dynamically initiate new instances of virtual servers and add them to a group of servers that participate in load balancing (e.g., by using a pre-configured machine image). In other words, when the number of members of the stressed security group to which a load balancer is subscribed, is more than a threshold, some such embodiments add new members to a group among which the load balancer balances implementation of a distributed application. This way, the newly added VMs compensate for the stressed servers when there is a spike in load.

Instead of, or in conjunction with, tagging the stressed servers as members of a stressed security group, some embodiments dynamically increase the overloaded resource (s) that was the reason for reporting an end machine as a stressed end machine. That is, in some embodiments, when the measurement data monitor receives a notification from the measurement data collection module about one or more resources of an end machine exceeding specified thresholds, the measurement data monitor sends a request to the host machine (e.g., the hypervisor of the host machine) for increasing the overloaded resource (e.g., a virtual disk space, a virtual CPU, a virtual network interface, etc.). Since each of the virtual resources of an end machine is mapped to a portion of a hardware resource of the host machine that hosts the end machine, the hypervisor of some embodiments increase the hardware resource allocated to the overloaded virtual resource when the hypervisor receives a request for doing so.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all of the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1:
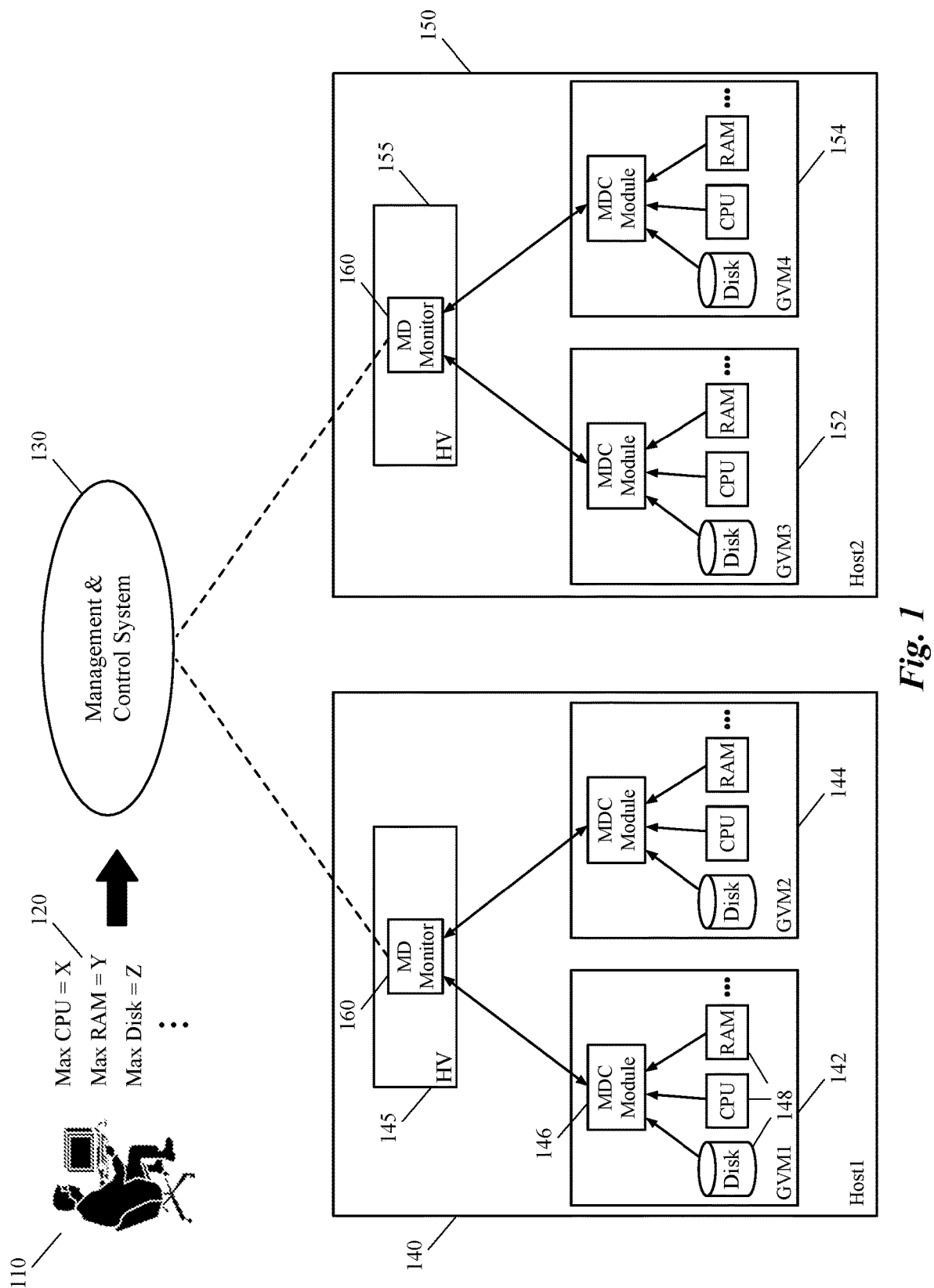
FIG. 1 illustrates a management and control system of a network receiving a tolerance policy from a user and configuring measurement data monitor in the hypervisors of a set of host machines and a measurement data collection module in each guest virtual machine (GVM) that runs on a host machine.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a method for collecting different measurement and statistical data from different computing resources of a data compute node (DCN) in order to identify a level of stress of the DCN. In some embodiments, a software instance or module (e.g., an agent, a driver, etc.) that is instantiated inside a DCN (e.g., in the kernel or user space of DCN) collects the measurement and statistical data from the computing resources (e.g., one or more CPUs, memory, etc.) of the DCN in real time. The measurement and statistical data, in some embodiments, include central processing unit (CPU) usage, available and used volatile and/or non-volatile memory, network activity, etc. of the end machine that are collected by the software module (also referred to as measurement data collection module or MDC module hereinafter) in real time.

The DCN of some embodiments is an end machine (e.g., a virtual machine) in a set of end machines of a logical network that run on one or more host machines of a hosting system (e.g., a datacenter). These end machines are logically connected to each other and to other end machines of other networks (logical and/or physical networks) through a set of logical forwarding elements of the logical network. The set of logical forwarding elements is implemented by one or more managed forwarding elements that operate (executes) on each host machine in some embodiments. A managed forwarding element, in some embodiments, operates in a virtualization software (e.g., a hypervisor) of a host machine. The set of logical forwarding elements is also implemented by one or more hardware forwarding elements through physical ports of which, a set of physical machines logically connects to the logical network.

A logical network, in some embodiments, in addition to several different L2 and L3 logical forwarding elements (e.g., logical switches and logical routers), includes other logical network elements (e.g., logical firewall, logical load balancer, etc.) that are placed on different logical paths of the logical network. Through the logical network elements several different data compute nodes (e.g., virtual machines (VMs), containers, namespaces, etc.) that run on different host machines connect to each other, to other physical machines of the logical network (e.g., that are connected to managed hardware forwarding element such as top of rack (TOR) switches, hardware routers, etc.), and to other end machines of other networks.

Different subsets of DCNs of a logical network reside on different host machines and are connected together through one or more logical forwarding elements in some embodiments. For example, a first VM of the logical network that executes on a first host machine is coupled to a first logical port of a logical switch, while a second VM of the logical network that executes on a second host machine is coupled to a second logical port of the logical switch. The first logical port of the logical switch is mapped to a software port of a first managed forwarding element that implements the logical switch and that executes on the hypervisor of the first host machine. The second logical port of the logical switch is mapped to a software port of a second managed forwarding element that also implements the logical switch and that executes on the hypervisor of the second host machine.

In some embodiments, a user defines a logical network topology (i.e., defines the logical network elements and the connections between these elements) for the logical network through a management system of the logical network. The management system of a logical network, in some embodiments, includes one or more manager machines (or manager applications) through which the different logical network elements are defined (through API calls). The management system generates configuration data for the defined network elements and pushes the configuration data to the control system of the logical network (e.g., one or more controller computers (or applications) that control the data exchange in the logical network). The management and control system pushes the initial and runtime configuration data to a set of physical nodes (e.g., host machines, gateway machines, etc.) in order to configure the physical nodes to implement the logical network.

In addition to receiving the logical network element definitions and generating the configuration data for implementing these elements, the management and control system of some embodiments also receives a tolerance policy for the end machines from a user (e.g., a network administrator, a tenant of a datacenter, etc.). In other words, in some embodiments, the user defines a tolerance policy that provides a threshold level for each computing resource of a particular set of DCNs (e.g., DCNs that belong to a particular logical network, DCNs that run on a particular set of host machines, all of the DCNs of a datacenter, etc.). The user may also define a host-level tolerance or threshold for different resources of a particular set of host machines (e.g., the host machines that implement one or more logical networks). In some embodiments, the user defines a tolerance policy for the logical networks (i.e., a maximum level of stress for end machines of the logical networks) through a set of API calls to the management system.

The management and control system, based on the user's policy definition, (1) configures the hypervisors of host machines to implement the measurement data monitors and (2) configures the DCNs that run on the host machines to implement the measurement data collection modules. The management and control system of some embodiments configures a unique measurement data monitor on each host machine and a unique MDC module on each DCN. In some embodiments, the MD monitor of a host machine receives the configuration data from the management and control system and configures each DCN that runs on the host machine to implement an MDC module.

FIG. 1 illustrates a management and control system of some embodiments configuring the host machines and guest virtual machines (GVMs) that run on the host machines to implement measurement data (MD) monitors and measurement data collection (MDC) modules. More specifically, this figure shows the management and control system of a network receiving a tolerance policy for DCNs (from a user) and configuring an MD monitor on each host machine of a set of host machines, and configuring an MDC module on each GVM that executes on a host machine in the set.

This figure includes a user 110 (e.g., a network administrator for a tenant, a network administrator for a datacenter, etc.), a management and control system 130 (e.g., a manager machine and a set of controller machines that manage and control one or more logical networks), and two host machines 140 and 150. Host machine 140 includes a hypervisor 145 and two guest virtual machines (GVMs) 142 and 144. Similarly, host machine 150 includes a hypervisor 155 and two GVMs 152 and 154. Each one of the GVMs includes a measurement data control (MDC) module 146 and a set of computing resources 148 (e.g., a disk, a CPU, a RAM, etc.). Each hypervisor executes an MD monitor 160 that communicates with the MDC modules of the GVMs of the same host.

The figure shows that the user 110 defines a tolerance policy 120 for the management and control system 130 that manages and controls the virtual machines GVM1-GVM4 (e.g., the GVMs of a logical network of a tenant). The dashed lines that connect the management and control system to the host machines represent the management and control plane data exchange between the manager and controller machines and the host machines in the physical network infrastructure over which the logical network is implemented.

The logical network logically connects GVMs 142 and 144 running on the host machine 140, to GVMs 152 and 154 running on the host machine 150 (and to other logical and physical networks). Although not shown, the logical connections of the GVMs do not necessarily match the physical connections of these GVMs as illustrated in the physical network. For example, GVMs 142 and 152 might be connected to a first logical switch, while GVMs 144 and 154 might be connected to a second logical switch, which is connected to the first logical switch through a logical router.

In some embodiments, the connections of the GVMs to logical switches (e.g. the first and second logical switches described above) are defined using logical ports of the logical switches, which are mapped to the physical ports of one or more managed forwarding elements (MFEs). For example, in the example given above, a first logical port of the first logical switch is mapped to a physical port of a first MFE that is coupled to GVM 142 running on the host machine 140, and a second logical port of the first logical switch is mapped to a physical port of a second MFE that is connected to GVM 152 running on the host machine 150. The first MFE executes in hypervisor 145 (not shown), while the second MFE executes in hypervisor 155.

When the first MFE receives a packet from GVM 142 that couples to the first port of the first logical switch, the first MFE performs the network forwarding processing for the first logical switch, to which the GVM1 is logically coupled. The same MFE, also performs the forwarding processing for any additional logical forwarding element (e.g., a logical router that connects the first and second logical switches). Based on the forwarding processing, the first MFE can decide where to send the received packet. For example, if the first MFE running on the host machine 140 decides to send a packet from GVM 142 to GVM 152, which is coupled to the second port of the first logical switch that is implemented by the second MFE running on the host machine 150, the first MFE sends the packet to the second MFE (through a tunnel that is established between the MFEs running on these two host machines). The second MFE then forwards the packet to GVM 152 (e.g., based on the MAC and IP addresses stored in the L2 and L3 headers of the packet).

The management and control system 130 is responsible for, among other things, generating, configuring, and managing different logical elements (e.g., logical switches, logical routers, logical middleboxes, etc.) that a user defines. The management and control system 130 manages and controls the network data communications between the different DCNs of a logical network (e.g., between GVM1-GVM4 in the illustrated example) by controlling the data communications between the MFEs that implement the logical forwarding elements. The management and control system 130 communicates with the MFEs in order to control the data exchange between the MFEs as virtual tunnel endpoints (VTEPs) that ultimately exchange the logical network data between the DCNs.

Additionally, the management and control system is responsible for generation, configuration, and management of different policies that a user (e.g., user 110) defines for the logical network such as a logical network security policy and a tolerance policy 120. As illustrated, the tolerance policy 120 includes a set of maximum usages that a user specifies for a set of computing resources of the GVMs. In the illustrated example, the user 110 has specified that maximum CPU usage for the set of GVMs should not pass % X. This means that if the CPU usage on any of the GVMs exceeds X percent (e.g., %80), the GVM should be tagged as a stressed machine. Tagging the GVMs results in improving the system efficiency in many different ways that will be described in great detail below.

After receiving the tolerance policy, the management and control system configures the GVMs to implement an MDC module 146 (e.g., in a kernel space of each GVM) through the MD monitors 160 that run in the hypervisors of the host machines. The MDC modules 146 are responsible for collecting measurement data such as CPU and memory usage and network activity of the GVMs in real time. Each MDC module 146 collects this data at each GVM at regular time intervals automatically, and/or upon occurrence of an event (e.g., receiving a manual request initiated by a user). Each MDC module 146, based on the maximum limit that is defined in the policy, reports a GVM on which the MDC runs, when the MDC determines that one or more of the computing resources are overloaded (i.e., the computing resource has exceeded the level of stress specified for the computing resource in the tolerance policy 120).

One of ordinary skill in the art would realize that the number of the host machines and GVMs illustrated in the figure are exemplary and a logical network for a tenant of a hosting system may span a multitude of host machines (and third-party hardware switches), and logically connect a large number of DCNs to each other (and to several other physical devices that are connected to the hardware switches). Additionally, while shown as VMs in this figure and other figures below, it should be understood that other types of data compute nodes (e.g., namespaces, containers, etc.) may connect to logical forwarding elements in some embodiments. Furthermore, each host machine includes many more elements besides the illustrated elements, which are not shown in the figure for simplicity of description.

The above introduced the general concepts of defining and applying a tolerance policy for a logical network that includes several GVMs through MD monitors and MDC modules in some embodiments. In the following, Section I describes how separating stressed GVMs from non-stressed GVMs increase the efficiency in data security management in a hosting system. Next, Section II describes load balancing a multi-layer application that is implemented by different layers' GVMs, employing a particular security group to avoid sending new connection requests to stressed GVMs. Section III then describes the electronic system with which some embodiments of the invention are implemented.

I. Data Security Management

As described above, the tolerance policy (i.e., maximum level of stress for the end machines of one or more logical networks) that a user defines for one or more logical networks can be used for different purposes in different embodiments. For instance, scheduled security scans for a particular set of GVMs (e.g., GVMs of a single tenant, GVMs running on a particular set of hosts, GVMs of every host of a datacenter, etc.) are performed automatically when the scheduled event occurs (e.g., a scheduled time is reached).

However, if one or more GVMs are overloaded, adding a security scan process to an already stressed GVM could result in failure of one or more computing resources of the GVM and ultimately in failure of the GVM. For example, a security scan could be scheduled (e.g., by a third-party security appliance) to perform on a VM when the CPU usage of the VM is high, available virtual memory (volatile or non-volatile memory) of the VM is low, or network activity of the VM is at a peak. Furthermore, scans could be scheduled on multiple VMs that run on a host machine when the host's physical CPU usage is high or any other of the host's hardware resources is at a critical condition.

Some embodiments provide security for the DCNs that run on a host machine by scheduling a security scan to be performed automatically on the DCNs (e.g., at certain time intervals) or upon occurrence of a certain event (e.g., upon a user request, when a DCN boots up on the host machine, etc.). The security scans, in some embodiments, include, but are not limited to antivirus scans, antimalware scans, vulnerability management scans, data security scans (to identify data that violates a security policy defined for one or more logical networks), etc. In some embodiments a security application (e.g., a third-party antivirus/antimalware software) schedules the security scans for the DCNs of a host machine through a security appliance (e.g., a third party service VM) that runs on the same host machine as the DCNs.

The security application of some embodiments runs on the security appliance or on another machine separate from the host machine. The security appliance receives the results of each security scan and either decides how to handle any potential security breach, or alternatively forwards the results to a separate machine to handle the potential security breaches. These security scans, however, are scheduled to be performed on the DCNs regardless of the current state of the DCNs. Therefore, when a DCN is overstressed (i.e., one or more resources of the DCN are overloaded), scanning the DCN would add more load to the already overloaded resources of the DCN and can result in failure of the resources and thereby failure of the DCN.

In order to improve and optimize the efficiency of a scheduled security scan, some embodiments do not allow a security scan to be performed on a stressed DCN of a host machine even though the schedule for the scan dictates otherwise. As described above, the MDC module of some embodiments reports a stressed DCN to the measurement data monitor that resides in the hypervisor of a host machine. The measurement data monitor of some embodiments, upon receipt of the notification, adds the reported stressed VM to a dynamic container (i.e., a stressed security group) which includes all of the stressed VMs.

Upon receiving a stress notification from an MDC module, the measurement data monitor of some embodiments also sends a notification to a security agent that resides in the hypervisor and that communicates with the security appliance running on the host machine. This notification informs the security appliance that the VM is overstressed and should not participate in any future scans. Some embodiments also define a security policy in which any VM that is tagged as a member of the stressed security group to defer data packets for scheduled scanning received from the security appliance. This way, even if the security appliance ignores the notification sent by the measurement data monitor, the security policy defined for the stressed security group causes the members of this group to defer scheduled scan requests till stress levels are within limits defined by the policy.

Figure 2:
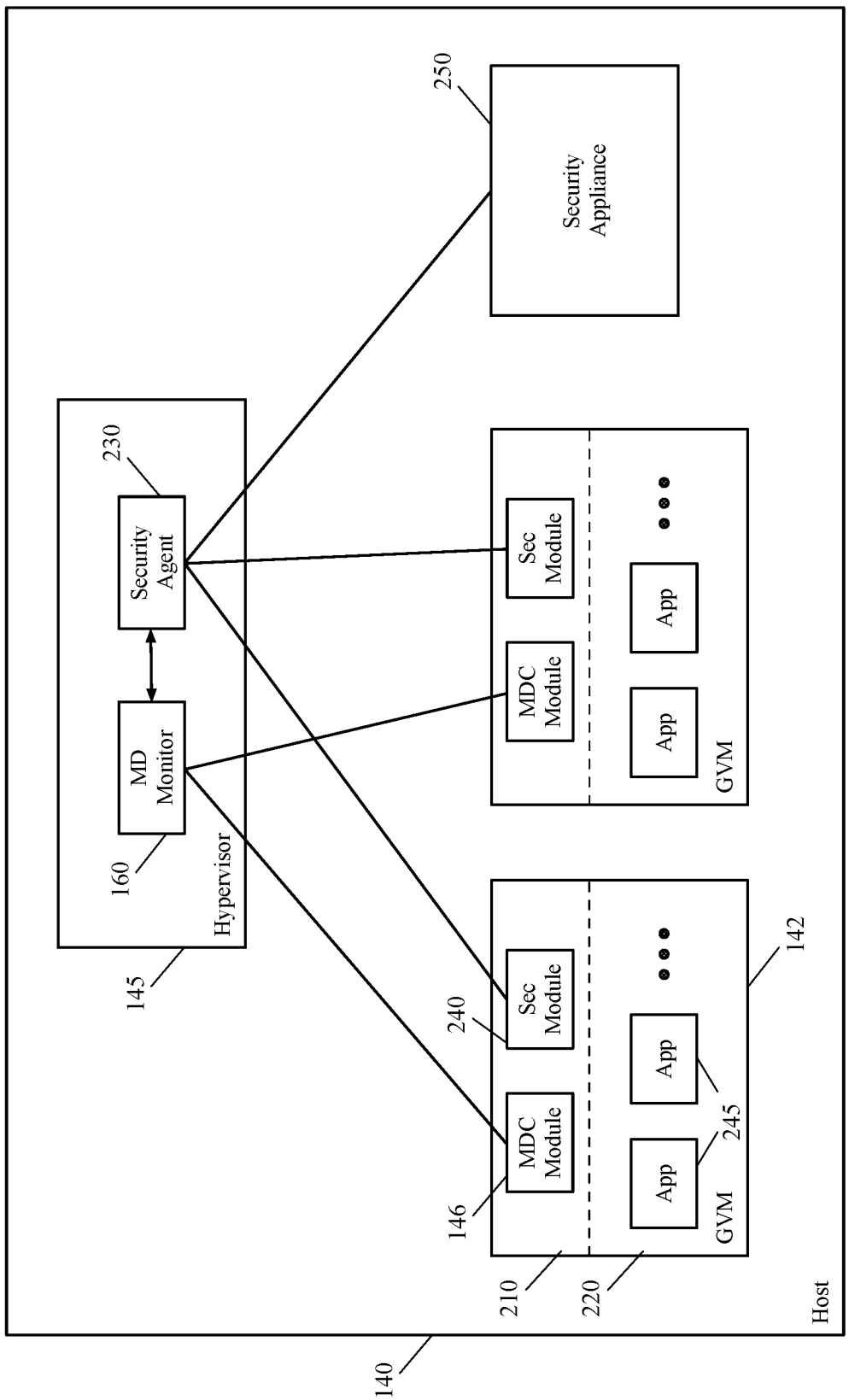
FIG. 2 illustrates an example of a security appliance (e.g., a third-party service VM) for performing guest introspection on different guest VMs residing in a host machine, and how an MD monitor operating in the hypervisor of the host machine increases the efficiency of such guest introspections.

FIG. 2 illustrates an example of a security appliance (e.g., a third-party service VM) for performing guest introspection on different guest VMs residing in a host machine, and how an MD monitor operating in the hypervisor of the host machine increases the efficiency of such guest introspections. The figure shows a host machine 140 that includes a hypervisor 145, several guest VMs 142 and a security VM 250. The hypervisor 145 executes a measurement data (MD) monitor 160 and a security agent 230. Each GVM 142 includes an MDC module 146 and a security module 240 that execute in the kernel space 210 of the GVM, and several different applications that execute in the user space 220 of the GVM.

It should be known that although shown as separate modules in the hypervisor, the MD monitor 160 and security agent 230 are implemented as a single module by the hypervisor of some embodiments. That is, in some embodiments, a single security agent that executes in the hypervisor of a host machine, communicates with both of the security module and MDC module that operate in kernel and/or user spaces of the guest VMs. In some such embodiments, the security agent performs all of the duties that described above for an MD monitor (e.g., configuring the MDC modules in the GVMs of the host, receiving stress notifications from the MDC modules of GVMs, tagging the stressed GVMs as members of stressed security group, removing non-stressed GVMs from the stressed security group, etc.). Additionally, in some embodiments, the MDC module 146 is a part of the security module 240 (e.g., a sub-module of the security agent) and not a separate module from the security module.

Some embodiments provide a framework that enables guest introspection (e.g., NSX Endpoint Security and vShield from VMware Inc.) without the need for any third party agents to be installed on individual guest VMs. Guest introspection includes file, network and system introspection in some embodiments. Some embodiments provide a security module 240 (e.g., a light weight kernel mode driver) on a GVM that catches all file, network, and system events on the Guest VM and passes that information to a security VM (appliance) 250 (provided by security partners including TrendMicro, Symantec, McAfee, etc.) via a security agent 230 that operates in the hypervisor 145 of the host machine.

Additionally, the security module 240 offloads security scans such as scheduled antivirus scans, vulnerability management scans, and other data security scans from the guest VM to a separate security appliance 250. Using a security appliance to perform scheduled scans in this manner avoids dreaded antivirus storms and optimizes pushing of virus definition updates to a single security VM as opposed to every GVM. These security scans can be scheduled to be performed automatically, or upon occurrence of an event. In some embodiments, instead of, or in conjunction with the security VM 250, the security scans can be scheduled and managed by a console (machine) that is separate from the host machine (e.g., from a remote third-party site).

In some embodiments, the MDC module 146 (e.g., a light weight kernel mode driver similar to security module 240 or a light weight user mode agent) collects different measurement data from the different computing resources (not shown) of the GVM periodically (or upon occurrence of a certain even such as a user request). During these data collections, if the MDC module realizes that any of the resources has surpassed the usage limit assigned to the resource (e.g., by a user and through the configuration data), the MDC module 146 sends a notification to the MD monitor 160 informing the monitor of such.

The MD monitor 160, as shown in the figure, executes on each host machine (e.g., in a virtualization software such as the hypervisor of a host machine) that hosts the end machines of the logical network as well as other end machines of other logical networks. The MD monitor 160 receives the load amounts from different stressed machines that operate on the host machine on which the MD monitor executes, and aggregates the received amounts in order to determine the host machine's level of stress in real time. In some embodiments, the MD monitor of a host machine reports the host machine as a stressed host machine when the aggregated amount is higher than a predefined threshold.

The maximum level of stress for a host machine is defined by a user in some embodiments. That is, in some embodiments, a user can define the maximum host-level of stress for the host machines that implement the logical networks through the same tolerance policy in which the user defines for computing resources of the GVMs. In some embodiments, when the host-level of stress surpasses the specified amount, the MD monitor 160 tags the host machine as a stressed host machine. In some such embodiments, the DCNs that run on the host machine then get scanned based on the security policy that is defined for the stressed host machines security group. Some embodiments do not scan any of the VMs that reside in a host machine that is tagged as a stressed host machine.

Some embodiments scan the DCNs of the host machine in a particular manner when the host machine is tagged as a stressed host machine. For example, in some embodiments, all of the DCNs of the host machine are not scanned at the same time when the host machine is stressed. In some embodiments, the DCNs are scanned one by one in a round-robin manner. That is, the security agent 230 sorts the end machines from the least-stressed end machine to the most-stressed end machine in the stressed host machine. The security agent 230 then starts scanning the end machines (through the security module 240 of each end machine) one by one from the least-stressed end machine to the most-stressed end machine. Some other embodiments, employ other methods of scanning of the end machines, when the host-level of stress of the host machine on which the end machines execute exceeds a predefined threshold.

After receiving a notification from the MDC module 146, the MD monitor 160 sends a notification to the security agent 240 to inform the security appliance 250. The MD monitor 160 also tags the GVM, from which the notification is received, as a stressed GVM. The MD monitor of some embodiments tags the GVM by adding the information of the GVM (e.g., GVM's IP address or any other unique VM ID) to a particular dynamic container for which a particular security policy is defined. For example, the security policy can be defined as, no new incoming network connection request for the distributed application should be serviced by the network elements that belong to the particular container, or no scheduled security scan can be performed on the network elements that belong to the particular container.

In some embodiments, when a security scan starts performing, the security appliance 250 (or the security agent 240) checks the stressed security group (i.e., the particular container for which the corresponding security policy is defined) for each DCN before sending a scan request packet to the security module 240 of the DCN. In some other embodiments, each time the security agent 230 receives a notification from the MD monitor 160 informing the agent about a new stressed VM, the security agent 230 notifies the security appliance 250 to add the VM's info to a no-scan table. This way, the appliance 250 does not have to check the stressed security group for each VM before sending the scan request to the VM.

Yet, in some other embodiments, the security appliance 250 sends the scan request to each VM of the host and does not check whether the VM is stressed or not. However, before a scan process is performed on the VM, the scan request packet is checked against the stressed security group (e.g., destination IP address of the packet is matched against the IP addresses of the VMs in the security group) and if a match is found, the packet is dropped or denied. Other embodiments exclude the stressed machines that are members of the stressed security group from being scanned in other ways.

As described above, when the load on a computing resource of a DCN exceeds a predefined amount, the DCN of some embodiments notifies a central monitoring agent of the host machine on which the DCN executes of such an overload. That is, when the usage of any of the resources of an end machine, from which the measurement data is collected, surpasses a predefined threshold, the method sends a notification to the central monitoring agent (also referred to as measurement data monitor) informing the monitoring agent about the overloaded resource as well as the load amount on the resource. For example, the MDC module running on an end machine sends a total amount of CPU usage of the end machine to the measurement data monitor when the CPU usage exceeds a certain percentage that has been defined for the MDC module (e.g., through configuration data with which the MDC module has been configured).

The MDC module collects the measurement data from different computing resources of a DCN in real time. In some embodiments, the MDC module collects the measurement data from the different resources periodically and at certain time intervals that can be overridden or modified. In some embodiments a user (e.g., an administrator can manually initiate data collection for one or more computing resources.

In some embodiment, the MDC module may receive updated measurement data from a resource that was previously overloaded, and as such the machine was reported as a stressed machine to the monitoring agent. The updated data, however, may indicate that the resource's usage now falls below a predefined threshold level. After receiving the updated data, the MDC module of some embodiments notifies the measurement data monitor of such a change (i.e., to inform the measurement data monitor that the DCN should not be considered as a stressed DCN anymore).

In some embodiments, when the MDC module receives measurement data that exceeds a first threshold amount from a DCN and tags the DCN as a stressed DCN, the MDC module uses a second threshold amount, that is different from the first threshold amount, to untag the DCN as a stressed DCN. The second threshold amount, in some embodiments, is calculated based on the value of the first threshold amount, which is received from a user (in a tolerance policy defined by the user). The calculated threshold amount for untagging a DCN as a stressed DCN, in some embodiments, is less than the threshold amount for tagging the DCN as a stressed DCN.

For example, an MDC module of a particular VM might have previously reported the VM as a stressed VM to a measurement data monitor of a host machine that hosts the VM. The VM might have done so when the MDC module of the VM determines that the usage of random access memory (RAM) of the VM has exceeded 80% (a threshold defined by a user). However, the MDC module will not untag the VM when the RAM usage of the VM returns to under 80%. This is because, the threshold amount for RAM usage to untag the VM is calculated at 65%. Therefore, if during a later data collection, the MDC module realizes that the free space in the VM's RAM is now over 35%, the MDC module sends a notification to the measurement data monitor to inform the monitor that the VM is not stressed anymore.

In some embodiments, a controller calculates the threshold amount to remove the DCN from a stressed security group, while in other embodiments the measurement data monitor of a host machine, or the DCN module itself yields this threshold amount. Yet, in some other embodiments, a user defines both stressed and unstressed threshold amounts for the computing resources in the tolerance policy. The reason for having different threshold amounts for tagging and untagging a DCN as a stressed DCN is to prevent rapid switching between the stressed and unstressed states for a particular DCN. In some embodiments, both threshold amounts, however, are the same and the intervals between collections of measurement data from a DCN is long enough to prevent such rapid changes of status.

Figure 3:
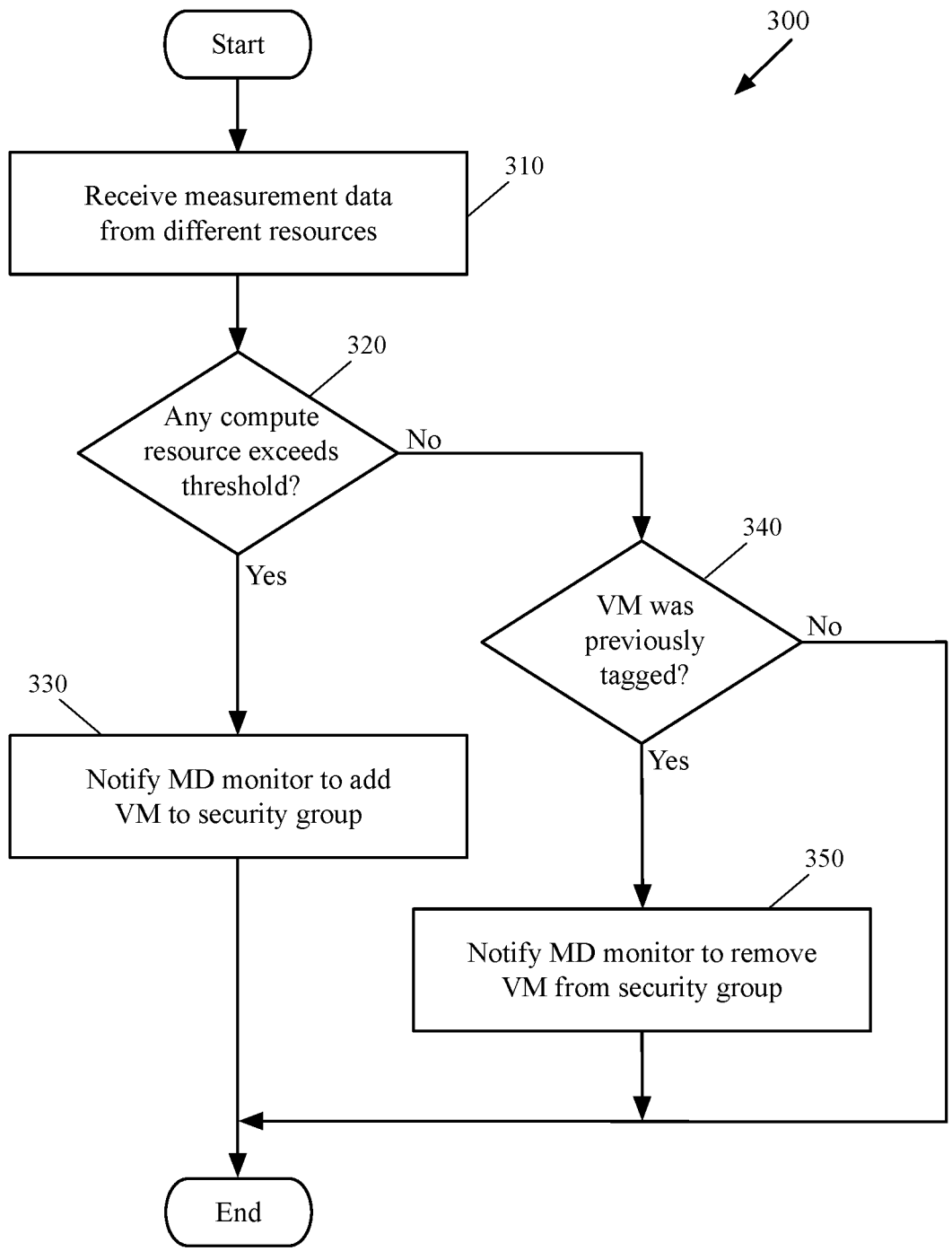
FIG. 3 conceptually illustrates a process of some embodiments for collecting measurement data from different resources of a data compute node (DCN) and tagging the stressed DCNs.

FIG. 3 conceptually illustrates a process 300 of some embodiments for collecting measurement data from different resources of a DCN and tagging the stressed DCNs. The process is performed by an MDC module that operates in the user or kernel space of the DCN in some embodiments. The process starts by receiving (at 310) different measurement data from different computing resources of the DCN. These computing resources may include, but is not limited to one or more physical and/or virtual CPUs, volatile and nonvolatile physical and/or virtual memories, physical and/or virtual network interfaces, etc. Each guest VM of some embodiments has virtual hardware (resources) that appears as physical hardware to the guest operating system running on the VM and to its applications.

A GVM of some embodiments is typically configured with at least one virtual CPU (the number of virtual CPU in some embodiments can reach 128 virtual CPUs). When a virtual CPU needs to run, the virtualization software of the host machine (i.e., the hypervisor) maps the virtual CPU to an available hardware execution context (HEC) in some embodiments. A HEC is a processor's capability to schedule one thread of execution, which corresponds to a CPU core or a hyperthread (if the CPU supports hyperthreading). Hyperthread or multicore CPUs, in some embodiments provide two or more HECs, on which virtual CPUs can be scheduled to run. When multiple virtual machines are running on one host machine, large amounts of memory can be more efficiently used on the host machine (e.g., transparent page sharing, guest memory reclaim, memory compression, etc.), which ultimately reduces the operating costs of a hosting system such as a datacenter.

As described above, the process 300 receives the measurement data from the different resources of a DCN at certain intervals or upon receiving a user request. After the process collects the measurement data, the process determines (at 320) whether the load amount for any of the resources, from which the measurement data is collected, has exceeded a predefined threshold (e.g., specified in the tolerance policy). When the process determines that at least one of the resources' load amount has exceeded the predefined threshold, the process sends (at 330) a notification to the MD monitor that runs in the hypervisor of the host machine. The notification tells the MD monitor to tag the VM as a stressed VM and add it to the stressed security group. The process then ends.

On the other hand, when the process determines that none of the resources' load amounts has exceeded the predefined threshold, the process determines (at 340) whether the healthy VM has previously been tagged as a stressed VM or not. When the process determines that the VM has been previously tagged as a stressed VM, the process sends (at 350) a notification to the MD monitor to untag the VM as a stressed VM and remove the VM from the stressed security group. The process then ends. If the process determines that the VM has not been previously tagged as a stressed VM, the process realizes that the VM is in a healthy condition and nothing needs to be done for it as far as the security scan is concerned. The process then ends.

The specific operations of the process 300 may not be performed in the exact order shown and described. For example, in some embodiments, when the process 300 determines that at least one of the computing resources' load amounts has exceeded the threshold, the process checks whether the VM was previously reported and if the VM was indeed reported before, the process does not send any notification to the MD monitor. This is because, if the VM was previously reported to the MD monitor, that means that the VM is already a member of the stressed security group and there is no need for adding the VM to the security group one more time.

Additionally, the specific operations may not be performed in one continuous series of operations, and different specific operations may be performed in different embodiments. For example, the process 300 of some embodiments along with sending a notification to the MD monitor about the stressed VM, also sends the amount of load that has caused the stress to the MD monitor. The monitor accumulates these amounts to determine whether the host machine is still below a host-level stress threshold. Additionally, one of ordinary skill in the art would realize that the process 300 could be implemented using several sub-processes, or as part of a larger macro process.

As described above, in some embodiments, when the measurement data monitor receives a notification from a stressed DCN, the monitor tags the DCN to be added to a particular security group, the members of which are all tagged as stressed machines. Similarly, when the measurement data monitor receives a notification from a DCN that was previously tagged as stressed and now is not stressed anymore, the monitor removes the tag from the DCN in order to remove the DCN from the particular security group.

Figure 4:
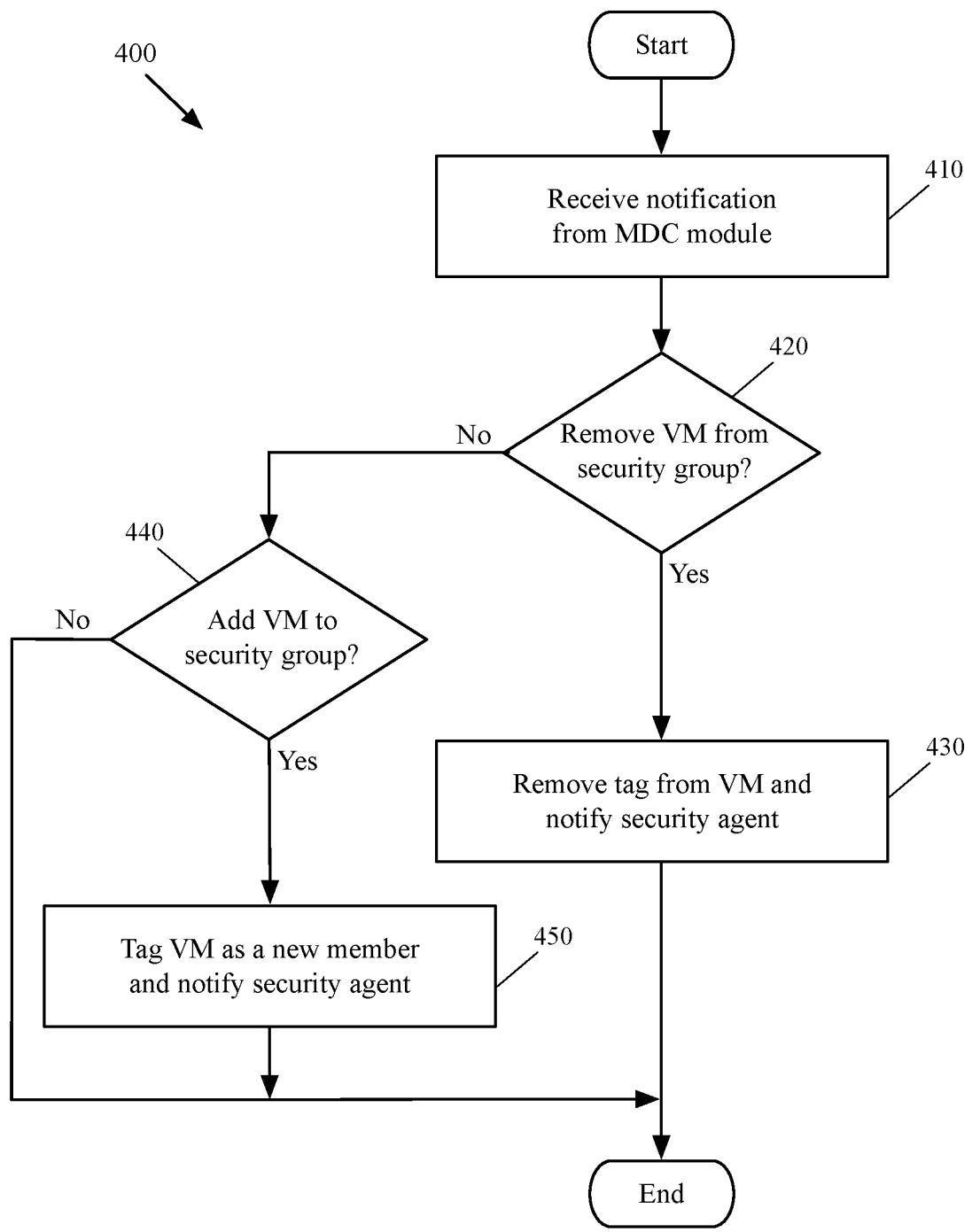
FIG. 4 conceptually illustrates a process of some embodiments for tagging the stressed DCNs and untagging non-stressed DCNs that had been previously tagged as stressed DCNs, based on a set of received notifications.

FIG. 4 conceptually illustrates a process 400 of some embodiments for tagging the stressed DCNs and untagging non-stressed DCNs that had been previously tagged as stressed DCNs, based on a set of received notifications. The process is performed by an MD monitor that operates in the hypervisor of a host machine in some embodiments. The process initiates by receiving (at 410) a notification from an MDC module that is instantiated and run in one of the DCNs of the host machine on which the process runs.

As described above, the process 400 receives such a notification when one of the DCNs is overstressed, or alternatively, when one of the DCNs that was previously overstressed is now in a healthy condition (i.e., none of the DCN's resources is overloaded). After the process receives the notification, the process determines (at 420) whether the notification is requesting for a DCN to be removed from the stressed security group. When the process determines that an MDC module has asked the process to remove the DCN from the stressed security group, the process untags (at 430) the DCN and removes the DCN from the security group. At the same time, the process sends a notification to the security agent that also runs on the hypervisor and communicates with the security appliance of the host machine. The notification informs the security appliance to include the non-stressed DCN in its future scheduled security scans. The process then ends.

On the other hand, when the process determines that the received notification is not a request for removal of a DCN from the stressed security group, the process determines (at 440) whether the received notification is requesting the process to add a DCN to the stressed security group. When the process determines that an MDC module has asked the process to add a DCN to the stressed security group, the process tags (at 450) the DCN as a new member of the security group. At the same time, the process sends a notification to the security agent that also runs on the same hypervisor on which the MD monitor runs, and communicates with the security appliance that resides in the host machine. The notification informs the security appliance to exclude the stressed DCN from its future scheduled security scans. The process then ends.

The specific operations of the process 400 may not be performed in the exact order shown and described. For example, in some embodiments, when the process 400 determines that the notification is not a request to remove the DCN from the stressed security group, the process tags the DCN as a stressed DCN. That is, the process does not determine whether the request is for adding the DCN to the stressed security group when the notification is not a request for removal. This is because, a notification that is received from an MDC module can either be a request to remove from or a request to add to a stressed security group. As such, the process does not need to check for the type of the received request twice.

Additionally, the specific operations may not be performed in one continuous series of operations, and different specific operations may be performed in different embodiments. Lastly, one of ordinary skill in the art would realize that the process 400 could be implemented using several sub-processes, or as part of a larger macro process.

Figure 5A:
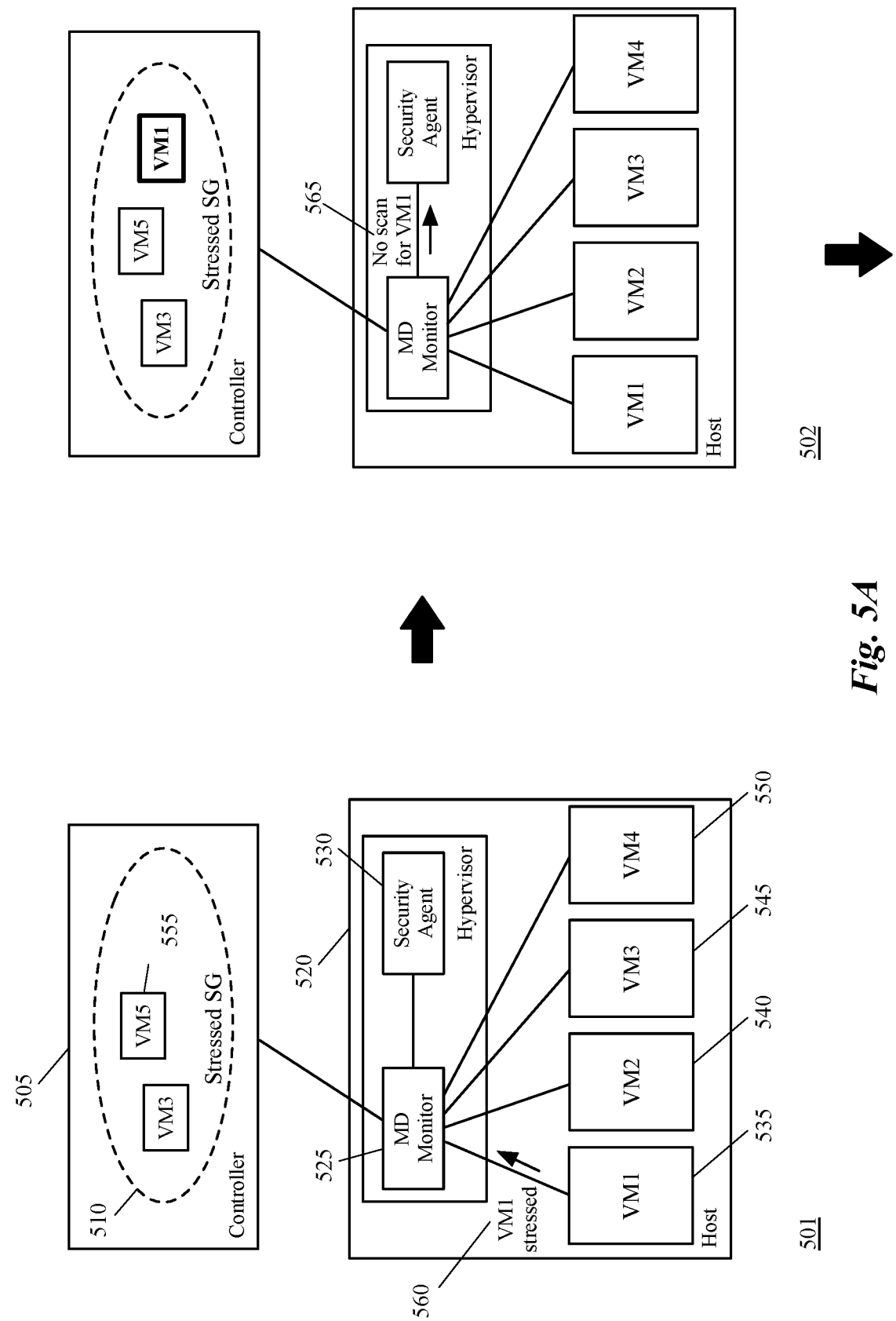
FIGS. 5A-5B illustrate example communications between a measurement data collection module, a measurement data monitor, and a security agent inside a host machine in order to include or exclude a VM from being scanned during a security scan of the VMs of the host machine.
Figure 5B:
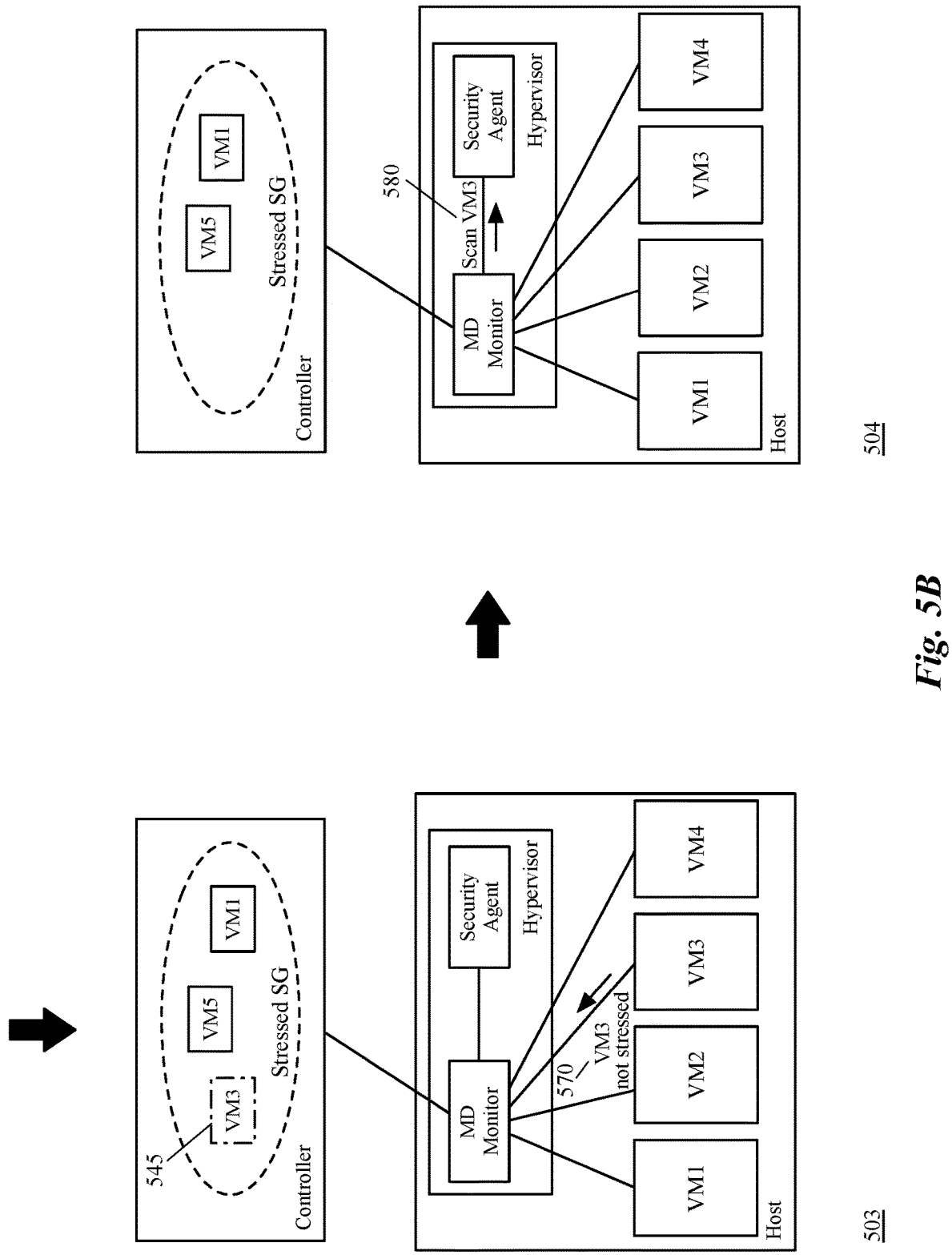

FIGS. 5A-5B illustrate example communications between a measurement data collection module, a measurement data monitor, and a security agent inside a host machine in order to include a VM for or exclude the VM from being scanned during a security scan of the VMs of the host machine. More specifically, these figures show, through four stages 501-504, that an overloaded VM sends a stress notification to an MD monitor in order to exclude the VM from future security scans, and another VM that is back to a healthy condition sends a notification to the MD monitor to be included in the next security scans.

FIGS. 5A-5B include a controller 505 and a host machine 520. The controller 505 includes a stressed security group 510, while the host machine 520 hosts four virtual machines 535-550 and executes an MD monitor 525 and a security agent 530 in the hypervisor of the host machine. The security appliance that communicates with the security agent 530 and the different modules of the VMs with which the security agent 530 and MD monitor 525 communicate are not shown in the figure for simplicity of description. It should be noted that the controller 505 is shown as storing just the one security group 510 of stressed VMs (e.g., as a folder, container, or other data structure), this controller would often store information about many different security groups as well as have various other modules and data structures.

In the first stage 501 of FIG. 5A, VM 535, which is one of the VMs running on the host machine 520, sends a stress notification 560 (e.g., a data packet with particular packet headers defined by the management and control plane of the network to act as a notification) to MD monitor 525. As described above, the VM sends such a notification when the MDC module of the VM realizes that at least one of the computing resources of the VM is overloaded (i.e., the usage of the resource has passed a particular amount of usage). This stage also shows that the stressed security group 510 currently has two members which are the virtual machines 545 and 555. In other words, these two VMs have already been declared as stressed VMs, and as such do not participate in any scheduled security scan.

The second stage 502 illustrates that, as a result of receiving the stress notification 560, the MD monitor 525 notifies the controller 505 to add the VM 535 to the stressed security group 510. The controller adds the stressed VM to the stressed security group by tagging the VM as a new member of the security group (e.g., by assigning the name of the security group to the identification information of the VM). This stage also shows that the MD monitor 525 sends a notification 565 (e.g., a particular packet) to the security agent 530 to inform the security agent about the stressed VM that has recently been added to the stressed security group. The security agent 530, in turn, notifies a service VM (i.e., a security appliance that runs on the same host machine 520) so that the service VM would exclude the stressed VM from any future scheduled security scans.

The third stage 503 in FIG. 5B shows that VM 545, which is one of the VMs that has already been declared as a stressed VM (and is included in the stressed security group), sends a non-stressed notification 570 to the MD monitor 525. As described above, the VM sends such a notification when the MDC module of the VM realizes that a previously tagged VM (i.e., stressed VM) is now in a healthy condition (i.e., none of the computing resources of the VM is currently overloaded).

In the fourth stage 504, as a result of receiving the non-stressed notification 570, the MD monitor 525 notifies the controller 505 to remove the VM 545 from the stressed security group 510. The controller removes the VM from the stressed security group by untagging the VM as a member of the security group (e.g., by removing the name of the security group from the identification information of the VM). This stage also shows that the MD monitor 525 sends a notification 580 to the security agent 530 to inform the security agent about the non-stressed VM that is recently removed from the stressed security group. The security agent 530, in turn, notifies the security appliance that runs on the same host machine 520 about the recent removal. As such, after receiving the notification, the security appliance of the host machine includes the non-stressed VM 545 in the future scheduled security scans (i.e., the security module of the VM will perform security scan on the VM when the scheduled event occur).

It should be understood that although the members of the stressed security group 510 are shown as VMs, a security group, in some embodiments, may include any type of network element (e.g., one or more virtual network controllers (VNICs), virtual machines, host machines, or any other compute and/or network construct that participates in a logical and/or physical network). As discussed above, in some embodiments, a stressed security group can be specified as a dynamic container that can have members (e.g., stressed VMs) dynamically added to and/or removed from the container (by tagging and untagging the members with the name of the security group).

II. Load Balancing a Distributed Application

Another advantage of having the stressed machines tagged in a particular (stressed) security group is to deploy the security group for load balancing a distributed application (e.g., a multi-tier web application). That is, in some embodiments, a load balancer (e.g., a logical or physical forwarding element) balances new remote service requests among several different servers (e.g., virtual and physical servers) of a server cluster that implements a distributed application. Some embodiments use the stressed security group to redirect new network connection requests (received from remote clients), that could have been directed to a stressed server based on the stressed server's network bandwidth, to other servers.

That is, the load balancer of some embodiments subscribes to the stressed security group to identify the stressed servers among the servers that implement the distributed application and foregoes sending new network connection requests to the stressed servers. The load balancer of some such embodiments does so even if the stressed server has enough network bandwidth for receiving new connections. In some embodiments, after subscribing to the security group, the load balancer receives callback notifications (from a controller that manages the security group) each time a new stressed server in the server cluster that implements the distributed application is added to the security group or each time a server is removed for the security group. Based on the callback notifications, the load balancer becomes aware of the updated status of the stressed servers and does not direct any new connections to these servers.

In other words, in addition to balancing the load of the application between the servers solely based on the network traffic that is currently routed to each server and the network bandwidth and availability of the servers, a load balancer also takes into account how busy each of these servers are before sending new network connection requests to the servers. In some embodiments, when a server is stressed (i.e., one or more of the server's computing resources are overloaded), all of the current active connections to the server are maintained and only new requests for connection are redirected to other servers (that are not stressed).

A multi-layer distributed application (e.g., for a tenant of a hosting system), in some embodiments, is implemented by different machines (e.g., virtual and physical servers) that are logically connected to each other in a logical network (e.g., the tenant's logical network). These machines, however, may have spread across several host machines, or connected to the logical network through one or more hardware switches (e.g., a third-party top of rack (TOR) switch) that implement the logical network. For example, a three-tier web application of a tenant of a datacenter may be implemented by several different web servers, application servers, and database servers that are logically connected to the tenant's logical network. Some of these servers run on one or more host machines that implement the logical network, while the others are connected to one or more hardware switches that also implement the logical network.

In some embodiments, a load balancer (or several load balancers) receives new remote requests to connect to the application (e.g., a request to access the web application) from the remote clients and based on the network traffic load routed to the first-tier servers (e.g., web servers) and the load on these servers sends each new connection request to one of the first-tier servers. Based on the type of request, a first-tier server may need to forward data to one or more second-tier servers (e.g., application servers) for further processing of the request. Some embodiments also provide a load balancer that based on the network traffic and the stress level of the second-tier servers decides to which second-tier server(s) forward the data.

Similarly, when a second-tier server is required to forward data to one or more third-tier servers (e.g., a database server), some embodiments provide a load balancer that based on the network traffic and the stress level of the third-tier servers decides to which third-tier server(s) forward the data. In other words, in some embodiments, each load balancer of the network is subscribed to a stressed security group (or a pool of stressed security groups) in order to determine which servers are tagged as stressed servers before deciding to which next tier server forward a request for connection or other requests for data or additional processing.

In some embodiments, the measurement data monitor, in addition to adding a reported stressed machine to the stressed security group, sends a notification to the load balancer(s) that balances the load of a distributed application between the different servers. This notification informs the load balancer that the machine is overstressed and should not participate in any future load balancing. Some embodiments also define a security policy in which any machine that is tagged as a member of the stressed security group would deny any new connection request packet received from a remote client (or a load balancer).

When the number of stressed machines that should participate in load balancing is more than a threshold, some embodiments dynamically initiate new instances of virtual servers and add them to a group of servers that participate in load balancing (e.g., by using a pre-configured machine image). In other words, when the number of members of the stressed security group to which a load balancer is subscribed, is more than a threshold, some such embodiments add new members to a group among which the load balancer balances implementation of a distributed application. This way the newly added VMs compensate for the stressed servers when there is a spike in load.

Figure 6:
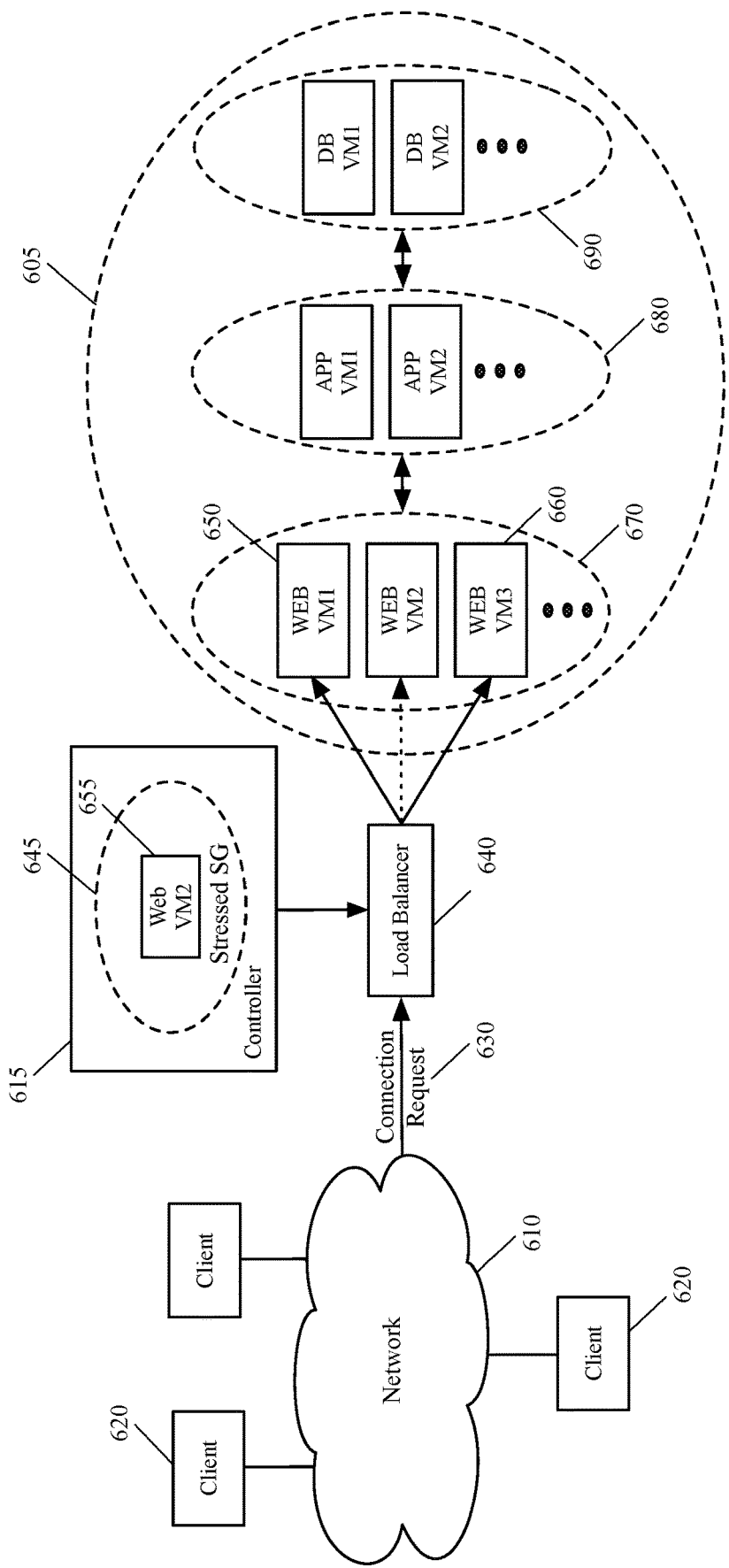
FIG. 6 illustrates a load balancer that employs a stressed security group to balance the load of a distributed multi-layer application among the servers of a multi-layer server cluster that implements the distributed application.

FIG. 6 illustrates a load balancer that employs a stressed security group to balance the load of a distributed multilayer application among the servers of a multi-layer server cluster that implements the distributed application. The figure includes an external network 610 to which several remote clients 620 are connected, a load balancer 640, a controller 615 that includes a stressed security group 645, and a server cluster 605. Additionally, the server cluster 605 includes three different layers of servers, namely a web layer 670 that includes several web servers 650-660, an application layer 680 that includes several application servers, and a database layer 690 that includes a set of database servers. It is important to note that even though shown as virtual machines, each one of these layers may include one or more physical servers as well.

Additionally, each one of the layers 670-690 can be a security group in some embodiments. That is, the server cluster 605 may include several different servers (virtual and/or physical) that are grouped in different security groups. This way, a data security policy (defined by a user) can be applied to the servers of each group independent of the servers of other groups even though the servers reside in different host machines or are connected to different physical switches. Although shown in the same security group or layer in this figure, as illustrated below by reference to FIG. 7, the virtual servers of each group do not necessarily execute on the same host machine.

A distributed application is a multi-layer (multi-tier) application that runs on several different machines within a network at the same time and can be stored on different servers. Unlike traditional applications that run on a single system, a distributed application runs on multiple systems simultaneously for a single task or job. A websites or web application is a good example of a multi-tier application.

In the illustrated three-tier architecture, the front-end web servers 650-660 in the web tier 670 implement the top most level of the application which is the content rendered statically or dynamically by a browser. The presentation tier displays information related to such services as browsing merchandise, purchasing and shopping cart contents. The web tier 670 communicates with other tiers by which it puts out the results to the browser/client tier and all other tiers in the network. In other words, the web tier 670 is a layer which users can access directly such as a web page, or an operating systems GUI.

The servers of application tier 680 (also referred to as business logic, logic tier, and middle tier) control the application's functionality by performing detailed processing. Finally, the servers of data tier 690 include both data sets and the database management system software that manages and provides access to the data. The database layer implemented by database servers provides an API to the application tier that exposes methods of managing the stored data without exposing or creating dependencies on the data storage mechanisms. Avoiding dependencies on the storage mechanisms allows for updates or changes without the application tier clients being affected by or even aware of the change.

As described above, the different servers of the cluster 605 implement a distributed application such as a web application. The figure shows that one of the remote clients 620 that is connected to the external network 610 (e.g., the Internet), sends a connection request 630 to the cluster 605. For example, when a user enters a website address in a web browser, a new connection request is sent to the web application that the website provides. However, before the request 630 reaches the cluster, a load balancer 640 catches the request in order to forward the request to the best candidate (e.g., the least busy server) first-tier server to process the request. Conventionally, a load balancer determines to which server sends the request based on different methods that only consider the network traffic being handled by the server.

The load balancer 640, however, in addition to the network traffic, takes into account the stress level of the servers. That is, the load balancer 640, first determines whether any of the servers to which the request could be forwarded (e.g., based on the servers' network activity) is a member of a stressed security group or not. If the server is considered to be a stressed server, the load balancer sets that server aside before performing the load balancing on the rest of the servers (e.g., based on the least number of network connections, least amount of response time, round robin, weighted round robin, etc.). The load balancer 640 of some embodiments makes such a determination by subscribing to the stressed security group 645 and receiving call backs from a controller that manages this security group each time a server is added to or removed from the security group. That is, each time a server is added to or removed from the security group 645, the controller 615 sends a notification to the load balancer 640 in order to notify the load balancer of such.

In the illustrated example, the web server 655 (WebVM2) has been determined as a stressed server and as such is added to the stressed security group 645. Therefore, when the load balancer 640 receives the new connection request 630, the load balancer knows that this server is a stressed server and should not be counted as one of the servers on which a load balancing method should be performed. Therefore, the load balancer 640 performs the load balancing only on the web servers 650 and 660 (and any other non-stressed server in the web layer) and selects one of them based on the result of the load balancing to establish a new connection for the client that has sent the service request. For example, the load balancer 640 selects the web server 660 over web server 650 because the web server 660 currently has less active network connections than the server 650.

It is important to note that the load balancer selects the web server 660 over the web server 655, even though the web server 655 might have less active network connections than the web server 660. The load balancer does not select web server 655 because a computing resource of this server (e.g., a virtual CPU of the server) is currently overloaded and as such the server is labeled as a stressed server, which should not receive any new connections.

As described above, additional load balancers (not shown) handle the traffic between the different server layers 670-690 in some embodiments. In some such embodiments, each load balancer of the network is also subscribed to the stressed security group 645 (i.e., communicates with the controller 615 when a change occurs in the security group) in order to determine which servers are tagged as stressed servers before deciding to which next tier server forward the network data in order for the different layers' servers to communicate with each other and to implement the distributed application.

Figure 7:
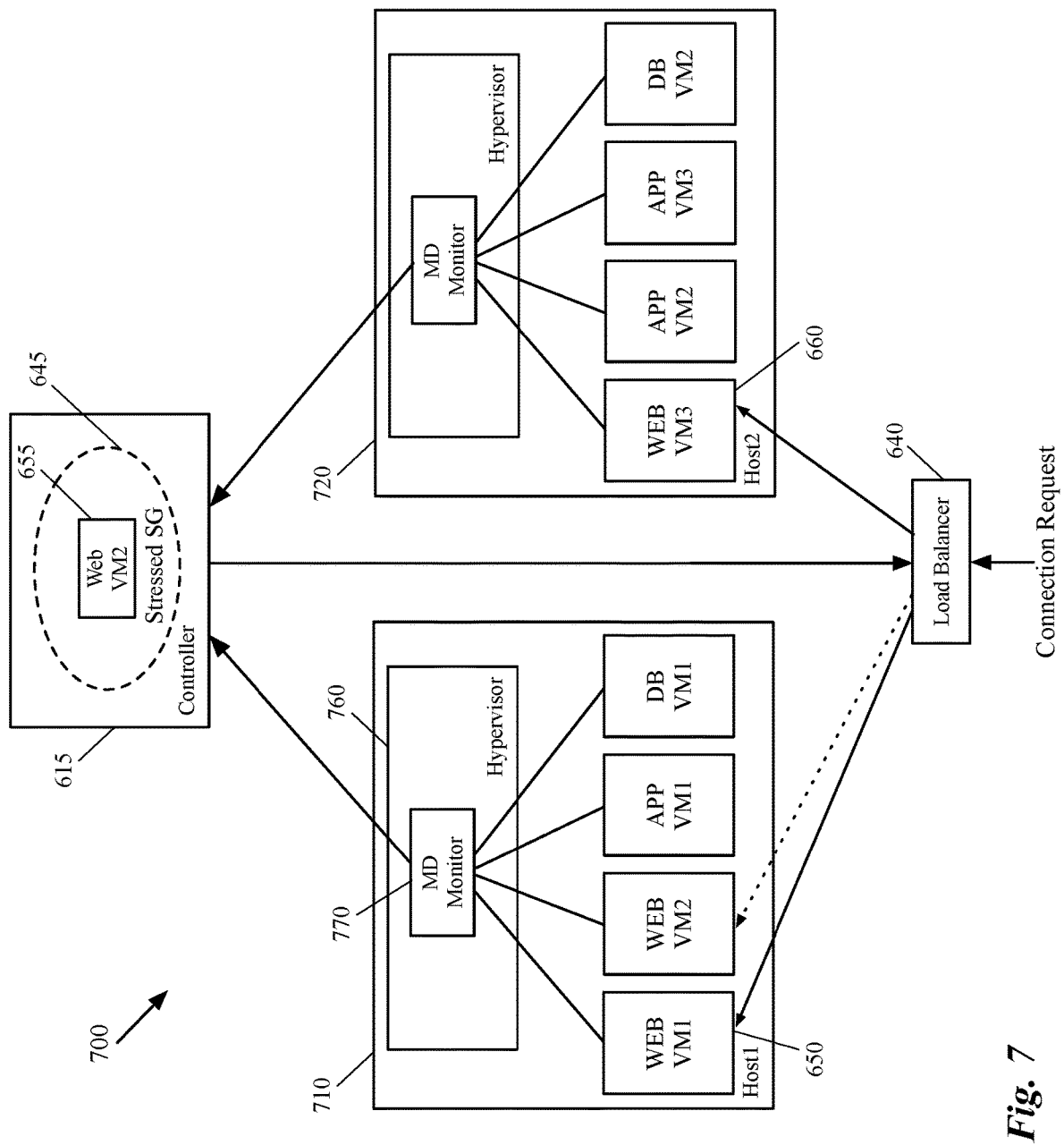
FIG. 7 illustrates a physical network infrastructure over which a logical network that logically connects the servers of server cluster illustrated in FIG. 6 is implemented.

FIG. 7 illustrates a physical network infrastructure 700 over which a logical network that logically connects the servers of server cluster 605, shown in FIG. 6, is implemented. This figure shows two host machines that implement the logical network to which the virtual servers of the server cluster are connected. More specifically, each of the host machines 710 and 720 executes a managed software switch (not shown) in the hypervisor 760 of the host machine, to which the virtual servers are connected. Each one of these managed software switches implements the logical ports of logical switches to which the virtual servers are logically connected.

As illustrated in the figure, although all of the virtual web servers 650-660 are in the same security group or layer 670 (as shown above by reference to FIG. 6), the virtual web servers 650 and 655 execute on the host machine 710, while the virtual web server 660 resides in the host machine 720. However, since each of the MD monitors 770 are configured to monitor the virtual machines of the server cluster (belonging to a logical network), the MD monitors tag the stressed VMs and untag the non-stressed VMs regardless of on which host machine the VMs are operating.

Figure 8:
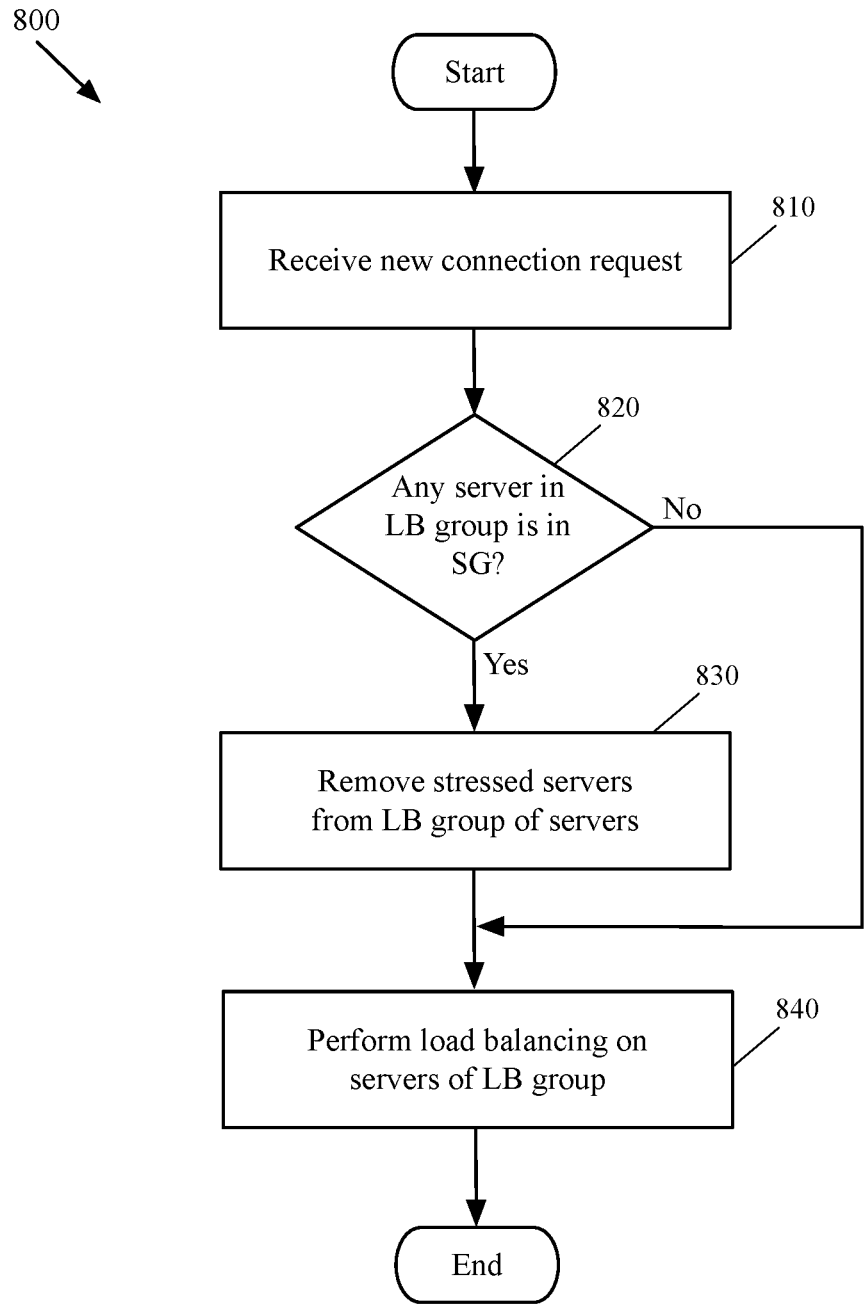
FIG. 8 conceptually illustrates a process of some embodiments that performs load balancing for a distributed application based on the stress level of the servers that implement the application and the network traffic that the servers handle.

FIG. 8 conceptually illustrates a process 800 of some embodiments that performs load balancing for a distributed application based on the stress level of the servers that implement the application and the network traffic that the servers handle. The process is performed by load balancer that balances the load of a distributed application over several different servers that implement the application in some embodiments. The process initiates by receiving (at 810) a new connection request. The new connection request can be a type of service request that is received from a remote client who wishes to communicate with the distributed application.

After receiving the request, the process determines (at 820) whether any of the servers on which the load balancing should be performed is in the stressed security group. As discussed before, the process can make such a determination by subscribing to the stressed security group and receiving call backs from the security group each time the member list in the security group is updated. When the process determines that there is no stressed server among the servers that should be load balanced, the process proceeds to operation 840 which is described below. On the other hand, if the process determines that there are one or more stressed servers among the servers that should be load balanced, the process removes (at 830) every server that is stressed from the group of servers on which the process performs load balancing.

At 840, the process starts sending a new connection request, or any other data related to a request coming from a remote client, to one of the remaining non-stressed servers that are candidates for receiving such data. As described above, some embodiments send the data to a server in a round robin (or a weighted round robin) manner, while other embodiments send the data based on the number of connections that the servers currently handle, or any other factor that results in more efficient communication between the remote clients and the servers and among the servers themselves. The process then ends.

The specific operations of the process 800 may not be performed in the exact order shown and described. For example, in some embodiments, the process first selects the server to which a new connection request should be sent and then determines whether the selected server is a member of the stressed security group or not. In some such embodiments, when the process determines that the server is a stressed member, the process iteratively selects the next best candidate to send the data, and determines whether the newly selected candidate is a stressed server or not. Additionally, the specific operations may not be performed in one continuous series of operations, and different specific operations may be performed in different embodiments. Lastly, one of ordinary skill in the art would realize that the process 800 could be implemented using several sub-processes, or as part of a larger macro process.

Instead of, or in conjunction with, tagging the stressed servers as members of a stressed security group, some embodiments dynamically increase the overloaded resource (s) that was the reason for reporting an end machine as a stressed end machine. That is, in some embodiments, when the measurement data monitor receives a notification from the measurement data collection module about one or more resources of an end machine exceeding specified thresholds, the measurement data monitor sends a request to the host machine (e.g., the hypervisor of the host machine) for increasing the overloaded resource (e.g., a virtual disk space, a virtual CPU, a virtual network interface, etc.). Since each of the virtual resources of an end machine is mapped to a portion of a hardware resource of the host machine that hosts the end machine, the hypervisor of some embodiments increase the hardware resource allocated to the overloaded virtual resource when the hypervisor receives a request for doing so.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
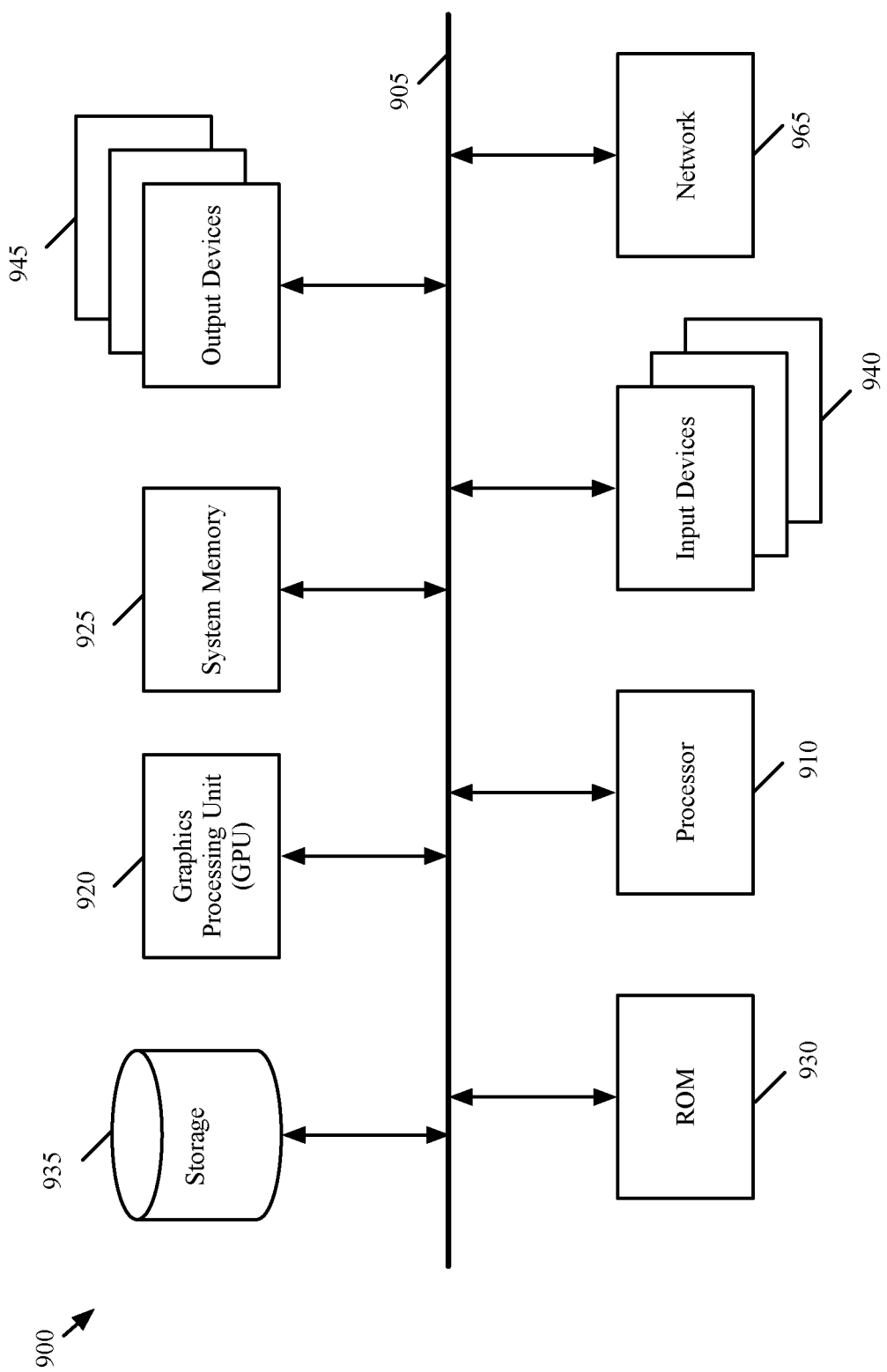
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieves instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash memory device, etc., and its corresponding drive) as the permanent storage device. Like the permanent storage device 935, the system memory 925 is a read-and-write memory device. However, unlike storage device 935, the system memory 925 is a volatile read-and-write memory, such a random access memory. The system memory 925 stores some of the instructions and data that the processor needs at runtime. In some embodiments, the invention's processes are stored in the system memory 925, the permanent storage device 935, and/or the read-only memory 930. From these various memory units, the processing unit(s) 910 retrieves instructions to execute and data to process in order to execute the processes of some embodiments.

The bus 905 also connects to the input and output devices 940 and 945. The input devices 940 enable the user to communicate information and select commands to the electronic system. The input devices 940 include alphanumeric keyboards and pointing devices (also called "cursor control devices"), cameras (e.g., webcams), microphones or similar devices for receiving voice commands, etc. The output devices 945 display images generated by the electronic system or otherwise output data. The output devices 945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

Additionally, the term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. In addition, a number of the figures (including FIGS. 3, 4, and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a host computer executing a plurality of end machines that are scheduled to be scanned for security check, a method for preventing stressed end machines from being scanned for security check, the method comprising:
at the host computer:
collecting a set of measurement data regarding usage of a set of resources of the host computer by a particular end machine;
determining whether at least one collected measurement data exceeds a threshold amount; and
when at least one collected measurement data exceeds the threshold amount, associating the particular end machine with a tag that identifies the particular end machine as a stressed machine and removes the particular end machine from a set of end machines that are subject to security scan checks that are initiated by a security engine executing on the host computer but operating outside of the particular end machine,
wherein the particular end machine is scanned for security check by a security agent executing on the end machine when the security agent receives a request to scan the particular end machine from the security engine operating outside of the particular end machine.

2. The method of claim 1, wherein associating the particular end machine with the tag comprises sending a notification message to a measurement monitoring module executing on the host computer, wherein the measurement monitoring module, upon receiving the notification message, identifies the particular end machine as a member of a stressed security group, members of which are not scanned in scheduled security checks.

3. For a host computer executing a plurality of end machines that are scheduled to be scanned for security check, a method for preventing stressed end machines from being scanned for security check, the method comprising:
collecting a set of measurement data regarding usage of a set of resources of the host computer by a particular end machine;
determining whether at least one collected measurement data exceeds a first threshold amount associated with a particular resource; and
when at least one collected measurement data exceeds the first threshold amount, associating the particular end machine with a tag that identifies the particular end machine as a stressed machine and removes the particular end machine from a set of end machines that are subject to security scan checks that are initiated by a security engine executing on the host computer but operating outside of the particular end machine, said associating comprising sending a notification message to a measurement monitoring module executing on the host computer, which upon receiving the notification message, identifies the particular end machine as a member of a stressed security group, members of which are not scanned in scheduled security checks;
collecting updated measurement data regarding the particular end machine usage of the particular resource;
determining that the updated measurement data is less than a second threshold amount; and
based on said determination, sending a notification message to the measurement monitoring module to remove the particular end machine from the stressed security group.

4. The method of claim 3, wherein the second threshold amount is less than the first threshold amount.

5. The method of claim 3, wherein the first and second threshold amounts are the same.

6. The method of claim 1, wherein the set of measurement data comprises at least one of CPU usage data, disk space availability data, network activity data, and volatile memory usage data for the end machine.

7. The method of claim 1, wherein collecting the set of measurement data for the set of resources of the particular end machine comprises collecting, at the particular end machine, the set of measurement data periodically.

8. The method of claim 1, wherein the security check comprises at least one of an anti-virus check, an anti-malware check, and a vulnerability management check.

9. For a host computer executing a plurality of end machines that are scheduled to be scanned for security check, a method for preventing stressed end machines from being scanned for security check, the method comprising:
collecting a set of measurement data regarding usage of a set of resources of the host computer by a particular end machine;
determining whether at least one collected measurement data exceeds a threshold amount; and
when at least one collected measurement data exceeds the threshold amount, associating the particular end machine with a tag that identifies the particular end machine as a stressed machine and removes the particular end machine from a set of end machines that are subject to security scan checks that are initiated by a security engine operating outside of the particular end machine, said associating comprising sending a notification message to a measurement monitoring module executing on the host computer, which upon receiving the notification message, identifies the particular end machine as a member of a stressed security group, members of which are not scanned in scheduled security checks, wherein the measurement monitoring module aggregates the measurement data from the plurality of end machines operating on the host computer, determines whether the aggregated amount exceeds a host-level threshold, and when the aggregated amount exceeds the host-level threshold, modifies how the plurality of end machines on the host computer are scanned.

10. A non-transitory machine readable medium of a host computer that executes a plurality of end machines that are scanned for security check, the non-transitory machine readable medium storing a program that when executed by at least one processor prevents an end machine from being scanned for security check, the program comprising sets of instructions for:

collecting a set of measurement data regarding usage of a set of resources of the host computer by a particular end machine;

determining whether at least one collected measurement data exceeds a threshold amount; and when at least one collected measurement data exceeds the threshold amount, associating the particular end machine with a tag that identifies the particular end machine as a stressed machine and removes the particular end machine from a set of end machines that are subject to security scan checks that are initiated by a security engine executing on the host computer but operating outside of the particular end machine;

wherein the particular end machine is scanned for security check by a security agent executing on the particular end machine when the security agent receives a request to scan the end machine from the security engine operating outside of the particular end machine.

11. The non-transitory machine readable medium of claim 10, wherein the set of instructions for associating the particular end machine with the tag comprises a set of instructions for sending a notification message to a measurement monitoring module executing on the host computer, wherein the measurement monitoring module, upon receiving the notification message, identifies the particular end machine as a member of a stressed security group, members of which are not scanned in scheduled security checks.

12. The non-transitory machine readable medium of claim 10, wherein the set of measurement data comprises at least one of CPU usage data, disk space availability data, network activity data, and volatile memory usage data for the end machine.

13. The non-transitory machine readable medium of claim 10, wherein collecting the set of measurement data for the set of resources of the particular end machine comprises collecting, at the particular end machine, the set of measurement data periodically.

14. The non-transitory machine readable medium of claim 10, wherein the security check comprises at least one of an anti-virus check, an anti-malware check, and a vulnerability management check.

15. A non-transitory machine readable medium of a host computer that executes a plurality of end machines that are scanned for security check, the non-transitory machine readable medium storing a program that when executed by at least one processor prevents an end machine from being scanned for security check, the program comprising sets of instructions for:

collecting a set of measurement data regarding usage of a set of resources of the host computer by a particular end machine;

determining whether at least one collected measurement data exceeds a first threshold amount associated with a particular resource; and when at least one collected measurement data exceeds the first threshold amount, associating the particular end machine with a tag that identifies the particular end machine as a stressed machine and removes the particular end machine from a set of end machines that are subject to security scan checks that are initiated by a security engine operating outside of the particular end machine, said set of instructions for associating comprising a set of instructions for sending a notification message to a measurement monitoring module executing on the host computer, which upon receiving the notification message, identifies the particular end machine as a member of a stressed security group, members of which are not scanned in scheduled security checks;

collecting updated measurement data regarding the particular end machine usage of the particular resource;

determining that the updated measurement data is less than a second threshold amount; and based on said determination, sending a notification message to the measurement monitoring module to remove the particular end machine from the stressed security group.

16. The non-transitory machine readable medium of claim 10, wherein the security engine is a security appliance or a security machine executing on a host computer.

17. The non-transitory machine readable medium of claim 15, wherein the first threshold amount for the particular resource is specified by a policy defined by a user, wherein the policy also specifies other thresholds for other resources in the set of resources of the particular end machine.

18. A non-transitory machine readable medium of a host computer that executes a plurality of end machines that are scanned for security check, the non-transitory machine readable medium storing a program that when executed by at least one processor prevents an end machine from being scanned for security check, the program comprising sets of instructions for:

collecting a set of measurement data regarding usage of a set of resources of the host computer by a particular end machine;

determining whether at least one collected measurement data exceeds a threshold amount associated with a particular resource; and when at least one collected measurement data exceeds the threshold amount, associating the particular end machine with a tag that identifies the particular end machine as a stressed machine and removes the particular end machine from a set of end machines that are subject to security scan checks that are initiated by a security engine operating outside of the particular end machine, said set of instructions for associating comprising a set of instructions for sending a notification message to a measurement monitoring module executing on the host computer, which upon receiving the notification message, identifies the end machine as a member of a stressed security group, members of which are not scanned in scheduled security checks, wherein the measurement monitoring module aggregates the measurement data from the plurality of end machines operating on the host computer, determines whether the aggregated amount exceeds a host-level threshold, and when the aggregated amount exceeds the host-level threshold, modifies how the plurality of end machines on the host computer are scanned.

* * * * *